US008070567B2

(12) United States Patent
Umino et al.

(10) Patent No.: US 8,070,567 B2
(45) Date of Patent: Dec. 6, 2011

(54) AUTOMATIC DEBONING METHOD AND APPARATUS FOR DEBONING BONE LADEN MEAT

(75) Inventors: Tatsuya Umino, Saku (JP); Tomohiro Uyama, Hiroshima (JP); Toshihide Takahashi, Brussels (BE); Osamu Goto, Saku (JP); Shozo Kozu, Saku (JP)

(73) Assignee: Mayekawa Mfg. Co., Ltd. (JP)

( * ) Notice: Subject to any disclaimer, the term of this patent is extended or adjusted under 35 U.S.C. 154(b) by 334 days.

(21) Appl. No.: 12/440,359

(22) PCT Filed: May 2, 2007

(86) PCT No.: PCT/JP2007/059805
§ 371 (c)(1),
(2), (4) Date: Mar. 6, 2009

(87) PCT Pub. No.: WO2008/047491
PCT Pub. Date: Apr. 24, 2008

(65) Prior Publication Data
US 2009/0270021 A1    Oct. 29, 2009

(30) Foreign Application Priority Data

Oct. 17, 2006 (JP) ................................. 2006-283101
Oct. 17, 2006 (JP) ................................. 2006-283102

(51) Int. Cl.
*A22C 17/00* (2006.01)

(52) U.S. Cl. .................................................... 452/136
(58) Field of Classification Search .............. 452/125, 452/132, 135, 136, 137
See application file for complete search history.

(56) References Cited

U.S. PATENT DOCUMENTS

| 4,332,190 A | 6/1982 | Mart |
| 4,993,113 A | 2/1991 | Hazenbroek |
| 5,643,074 A * | 7/1997 | Linnenbank .................. 452/165 |

(Continued)

FOREIGN PATENT DOCUMENTS

EP    439784 A1    12/1990

(Continued)

OTHER PUBLICATIONS

International Search Report issued in corresponding application No. PCT/JP2007/059805, dated Jul. 31, 2007.

*Primary Examiner* — Richard Price, Jr.
(74) *Attorney, Agent, or Firm* — Rossi, Kimms & McDowell LLP

(57) ABSTRACT

A de-boning method and apparatus for automating incision making to the meat of bone laden meat and scraping operation of meat from the bone laden meat by a meat separator, are proposed.

The apparatus has a clamping device 1 for clamping an end part 'd' of unconcealed part of the bone of bone laden meat, a meat separator 31 having meat scraping plates 317a, 317b for pinching a bone of the bone laden meat, a cutter 33 located between the clamping device 1 and the meat separator 31, a clamping device lifting means 30, and rotation drive means 303 and 313 for rotating for rotating the clamping device 1 and the meat separator 31 in synchronism with each other, whereby spiral incision is made to a part of the meat of the bone laden meat by rotating the clamping device 1, and remaining part of the meat is scraped off as the clamping device is lifted while rotating in synchronism with the meat scraper.

14 Claims, 21 Drawing Sheets

U.S. PATENT DOCUMENTS

| | | | |
|---|---|---|---|
| 5,660,583 A * | 8/1997 | Roberts | 452/136 |
| 5,713,787 A * | 2/1998 | Schoenmakers et al. | 452/136 |
| 5,961,383 A * | 10/1999 | Janssen et al. | 452/135 |
| 6,106,384 A * | 8/2000 | Mutoh et al. | 452/135 |
| 7,059,954 B2 * | 6/2006 | Annema et al. | 452/136 |
| 7,195,554 B2 * | 3/2007 | Hayakawa et al. | 452/135 |
| 7,198,564 B2 * | 4/2007 | Hino et al. | 452/135 |
| 7,344,436 B2 * | 3/2008 | Hayakawa et al. | 452/135 |
| 7,367,878 B2 * | 5/2008 | Jensen et al. | 452/135 |

FOREIGN PATENT DOCUMENTS

| | | |
|---|---|---|
| EP | 590733 A1 | 9/1993 |
| EP | 687416 A1 | 6/1995 |
| JP | 2000-106818 A | 4/2000 |
| JP | 2004-321032 A | 11/2004 |
| WO | 2004/068953 A1 | 8/2004 |

* cited by examiner

AUTOMATIC DEBONING METHOD AND APPARATUS FOR DEBONING BONE LADEN MEAT

TECHNICAL FIELD

This invention relates to an automatic de-boning method and apparatus for removing bones from bone laden meat such as an arm part meat block or thigh part meat block of a slaughtered domestic animal, with which a high level of automation and high yield rate of meat can be achieved by automating processes of incision making and meat scraping-off by a meat separator.

BACKGROUND ART

The inventors of the present application proposed a semi-automated pig thigh de-boning apparatus and method of de-boning pig thigh using the apparatus in Japanese Laid-Open Patent Application No. 2000-106818 (patent literature 1). In the de-boning apparatus, preprocessing, lower thigh bone removing operation, and thigh bone removing operation are carried out while the ankle part of a pig thigh is held by a damper attached to a transfer chain and transferred in a hanged state through each station.

In the fully automated step succeeding the preprocessing step of the de-boning apparatus, the pig thigh (work) hanging from the damper is made incision around the lower thigh and thigh with a cutter while scraping off the meat adhering to the bones with a meat separator. By this, biological tissue such as meat, muscle, and tendons adhering to the bones is cut, and meat is separated from the bones step by step. These incisions are made at determined positions in longitudinal direction of the bones by rotating the work.

Further, the inventors also proposed a de-boning apparatus arm part meat block and shoulder butt of a slaughtered animal in W2004-068953 (patent literature 2). In this apparatus, preprocessing of removing shoulder butt, spareribs, and lower forelimb bones is done, and then incision is made around the upper forelimb bone and shoulder blade. Like this, preprocessing is performed to the maximum extent and then automatic de-boning is limited to the minimum necessary extent, that is, only removing of shoulder blade and upper forelimb bone is automated. This apparatus is suitable to middle to small scaled meat processing factories featured in space-saving and cost-saving.

DISCLOSURE OF INVENTION

However, with the method of de-boning of the thigh part of a pig disclosed in the patent literature 1, preprocessing of incision making to the lower thigh and thigh is carried out manually. In the de-boning apparatus of arm part meat block disclosed in the patent literature 2, incision making around the upper forelimb bone and shoulder blade is carried out manually. Therefore, automation level is not so high in both the patent literature 1 and 2. Incision making along the surface of the bones of the thigh part and arm part meat block must be performed without allowing cutters to bite into the bones. Further, three dimensional contours of the bones are complicated, for they have bent parts, twisted parts, plumpy parts, etc. Therefore, it has bee difficult to automate incision making along the bones maintaining accuracy without bruising or scathing the bones.

With the de-boning apparatus disclosed in the patent literature 1, meat separating process by the meat separator is divided into many steps in order to prevent clogging of meat at the pinching part of the meat separator, separating stroke in each step is small and repeated pinching operation is necessary, so many sets of combination of meat separator and work lifting device are required, as a result the apparatus become large scaled, many processing steps are necessary, and increase time is needed for processing.

The invention was made in light of problems mentioned above, and aims to provide a method and apparatus for removing bones from an arm part meat block, thigh part meat block, etc. of a slaughtered animal, with which incision making that has conventionally been operated manually is automated to increase operation efficiency and meat separating can be carried out in an expeditious way.

Further, the invention aims to perform accurate incision making operation to attain high yield of meat, by automating incision making performed manually as preprocessing in the past.

To attain the object, the present invention proposes a method of de-boning a bone laden meat hanging with an end part of unconcealed part of the bone clamped with a clamping device by lifting up the bone laden meat in a state the bone laden meat is pinched under the end part by meat separator having a set of meat scraper plates which pinches always elastically the bone of the bone laden meat below the end part following change of size of the bone as the bone laden meat is lifted up in order to scrape off the meat part of the bone laden meat, wherein the bone laden meat is lifted up while being rotated so that a part of the meat including tendons is cut and scraped by spiral incision with a cutter located under the clamping part above the meat separator caused by the rotation of the bone laden meat, and wherein the remaining meat is scraped off by the meat separator while allowing the meat separator to rotate in synchronism with the bone laden meat as the bone laden meat is further lifted up.

Further, the invention proposes to implement the method an apparatus for de-boning a bone laden meat, the apparatus having a clamping device for clamping an end part of unconcealed part of the bone to hang the bone laden meat, and a meat separator having a set of meat scraper plates which pinches always elastically the bone of the bone laden meat below the end part following change of size of the bone as the bone laden meat is lifted up, thereby scraping off meat part of the bone laden meat, wherein are provided a cutter between the clamping device and meat separator, a lifting means for lifting the clamping device, and a rotating means for rotating the clamping device and the meat separator in synchronism with each other, whereby a part of the meat is scraped off as the clamping device is lifted up while incision is made spirally to the part of the meat including tendons owing to the rotation of the bone laden meat, then remaining part of the meat is scraped off by means of the meat separator rotating in synchronism with the meat separator as the bone laden meat is lifted up.

According to the method and apparatus of the invention, as incision is made spirally to meat around bones, biological tissue such as tendon, muscle, and meat can be cut with certainty even at the joint part where tendons adhere firmly. Further, the bone laden meat is lifted up while making incision spirally, so the tendon at the joint part can be cut without fail, and the scraping off of meat is performed by the meat separator by further lifting up the bone laden meat, clogging of meat at the pinching part of the meat separator does not occur and incision making around bones and scraping-off of meat can be performed in one operation continuously.

It is preferable that a cutter guard is provided to cover the upper surface of the cutter and the cutter guard can be shifted so that exertion of the cutting edge of the cutter from the cutter guard is adjustable. As incision is made spirally while lifting the bone laden meat, there is possibility that shearing force, i.e. meat scraping force exerting on the cutter increases and causes breakage of the cutter when depth of incision is excessively large. Providing the cutter guard can prevent this.

As exertion of the cutting edge of the cutter from the cutter guard can be adjusted by shifting the cutter guard, depth of incision can be restricted. When large force is required such as when making incision at the joint part, the cutter guard is shifted backward to increase the exertion of the cutting end of the cutter from the cutter guard. As cutting depth can be adjusted in accordance with cutting force required, incision can be made smoothly even at the part where large cutting force is required while occurrence of breakage of the cutter is prevented.

When the bone laden meat is an arm part meat block of a dressed carcass, the clamping device clamps an exposed end part of lower forelimb bones to hang the arm part meat block, and an auxiliary damper is provided to the clamping device for holding an exposed end part of an upper forelimb bone of the arm part meat block after the meat around the lower forelimb bones is scraped off by the spiral incision. By holding the upper forelimb by the auxiliary clamper, dislocation of the joint between the lower forelimb bones and upper forelimb bone is prevented when the bone laden meat is further lifted up to scrape off meat from the upper forelimb bone by the meat scraper.

It is suitable to compose the apparatus such that, a measuring means for measuring length of the arm part meat block clamped by the clamping device and hanging from it from the clamped position to the lower end of the arm part meat block, a plurality of programs for computing a lift amount to be lifted by the lifting means and a shifting amount of the cutter guard in correspondence with measured length of the arm part meat block, and a selecting means for selecting a program which corresponds with the measured length of the arm part meat block, are provided, whereby de-boning operation is carried out depending on individually different size of the arm part meat block by controlling lifting amount of the clamping device and shifting amount of the cutter guard in accordance with the measured length of the arm part meat block.

With this construction, depth of cut when incision is made spirally can be controlled in accordance with difference in size of individual bone laden meat, so incision of proper depth can be done according to size of the bone laden meat. Therefore, remnant meat on the bones is reduced resulting high yield of meat and at the same time excessive force due to meat scraping action of the cutter can be evaded resulting in smooth incision making.

The automatic de-boning apparatus for de-boning a bone laden meat having a first bone segment and a second bone segment according to the invention is composed such that, a section (hanging section) for de-boning the first bone segment of the bone laden meat in a state it is hanging from a clamping device, and a section (conveyor section) for de-boning the second bone segment of the bone laden meat in a state it is place on a conveyor, are provided, whereby meat around the first bone segment is scraped off by using a de-boning apparatus of claim 2 after incision is made in longitudinal direction along the first bone segment in a state the bone laden meat is hanged in the hanging section, meat from which the first bone segment is removed is placed on the conveyor with thin meat on the second bone segment upside, the thin meat which is separated from the surface of the second bone segment by making incision between the thin meat and the surface of the second bone segment, is turned over to expose the upper surface of the second bone segment, incision is made along the side contour of the second bone segment, then the second bone segment is scraped off from meat adhering on the rear surface of the second bone segment in the conveyor section.

The automatic de-boning apparatus is composed of a hanging section for de-boning the first bone segment of the bone laden meat in a state it is hanging from a clamping device and a conveyor section for de-boning the second bone segment of the bone laden meat in a state it is place on a conveyor. In the hanging section, handling of the bone laden meat which is weighty is eased by carrying out be-boning in a hanged state. By this, workers can be released from hard labor and operation usually done on a dressing table is eliminated, as a result, sanitary de-boning is possible preventing adhesion of microbes to the work.

In the hanging section is carried out incision making along the longitudinal direction of the first bone segment. This incision is made by stabilizing the hanged bone laden meat and applying a cutter against the meat or by applying the meat against a fixed cutter. By this, automatic incision is possible. For example, complicated movement of the cutter can be operated by using a drive mechanism such as a multi-axis multi-joint robot arm which moves along a trajectory under a program.

In this section, removal of meat around the first bone segment from the bone is completed.

This de-boning of the first bone segment is carried out using the de-boning apparatus of the present invention. By the apparatus, biological tissue such as tendon, muscle, and meat can be cut with certainty even at joint part where tendons adhere firmly by making incision spirally. Further, spiral incision is made by lifting up the bone laden meat while scraping the meat in the spirally cut region followed by meat scraping-off by the meat separator, so clogging of meat at the pinching part of the meat separator pinching the meat does not occur, and incision making around the bone and meat scraping off can be performed in one continuous operation.

In the conveyor section, removing of the second bone segment which is near one of the surface of the meat is performed placing the bone laden meat transferred from the hanging section onto the conveyor in the conveyor section. By this, accurate incision making and high yield meat removing can be attained.

Concretively, the meat having the second bone segment is allowed to be placed on the conveyor with the surface of the thin meat upside, incision is made along the side contour and the rear surface thereof, and the second bone segment is removed. The processing can be performed automatically with high accuracy, resulting in high yield of meat.

Like this, by combining de-boning process in hanged state from the clamping device and in lying state on the conveyor, incision making that was difficult in apparatuses of prior art is made easy and automated. As a result, automation level of de-boning operation is increased, and high yield meat separation is realized.

In the invention, it is suitable to provide in the hanging section a transfer mean for transferring the bone laden meat intermittently to succeeding stations and a means for making at least incision and a means for scraping off the meat around the first bone segment after the incision is made to the meat. By transferring the bone laden meat intermittently and allowing the bone laden meat to stop at each station in the hanging section, processing in each station can be eased.

It is preferable that conveyors are provided in the conveyor section, and an exposing means for exposing the upper surface of the second bone segment, a second incision making means for making incision along the side contour of the second bone segment, and a second separating means for scraping off the second bone segment are provided for each of the conveyors.

By this, each of the processing for the second bone segment can be carried out on each of the conveyors.

It is suitable to compose the apparatus such that the second incision making means has a cutter for making incision, a computing unit for determining depth of incision to be made based on distance of descent of a sensor descended from above the upper surface of the second bone segment until the sensor end terminal contacts the upper surface of the second bone segment, and a cutter drive device for moving the cutter in correspondence with result of the computation by the computer unit, whereby the incision is made in accordance with individually different size of the second bone segment.

With this construction, height position of the surface of the second bone segment is detected, and depth of incision along the side contour of the second bone segment is determined based on the detected height position, occurrence of injury to the meat due to unnecessarily large depth of incision can be prevented.

As incision is made with appropriate depth depending on the size of individual bone laden meat, accurate incision can be made in accordance with difference in size of individual bone laden meat.

It is preferable to provide a vertical position detector of the cutter to the cutter drive device, thereby the cutter functioning also as a sensor end terminal. By this, it is not needed to provide a sensor separately, which contributes to simplification of the apparatus.

The exposing means for exposing the upper surface of the second bone segment includes a thin flexible cutter provided in the hanging section for making incision between the thin meat adhering on a surface of the second bone segment and the surface by advancing the flexible cutter along the surface of the second bone segment, and a bar member provided in the conveyor section to turn over of the thin meat separated from the surface of the second bone segment and lying on the surface in the hanging section by allowing the bar member to contact the rear surface of the thin meat thereby pushing the rear surface as the bone laden meat is transferred on a conveyor in the conveyor section.

Incision for the thin meat part is performed in a state of the bone laden meat hanged and supported to prevent swinging thereof, so incision is made easy and accurately. By virtue of flexibility of the flexible cutter, the cutter can follow the surface of the second bone segment always maintaining close contact with the surface. Therefore, separation of the thin meat from the surface of the second bone segment can be performed with high yield of meat.

It is suitable that the incision making section are provided with a length measuring means for measuring distance from the clamped part of the bone laden meat clamped by the clamping device and hanged to the lower end of the bone laden meat, a plurality of programs in each of which is established beforehand a trajectory of movement of the flexible cutter in correspondence with length of the bone laden meat, a selecting means for selecting a program from among the plural programs in correspondence with the measured length, and a means for driving the cutter under the selected program, whereby the incision is made between the thin meat and the surface of the second bone segment in correspondence with individually different size of the second bone segment.

By measuring length of the bone laden meat from the part it is clamped to the lower end thereof by the measuring means, selecting a program in which a trajectory of movement of the cutter corresponding with the measured length is established, and allowing the cutter to move under the selected program, incision is made along a trajectory in correspondence with the size of individual bone laden meat. Therefore, incision can be made always accurately for individual bone laden meat different in size.

It is preferable that, when the second bone segment has a cartilage part, a plate member is provided in the conveyor section for holding down the upper part of the cartilage part when meat is scraped off from the lower surface of the second bone segment, thereby preventing the cartilage from being damaged when scraping off the meat. For example, when the second bone segment is a shoulder blade, scapular cartilage is adhering to an end part of the shoulder blade. By holding down the cartilage part by the plate member, occurrence of deformation or bending of the cartilage can be prevented.

The bone laden meat processed by the apparatus of the invention is a bone laden meat with meat adhering around bones such as an arm part or thigh part meat block, for example an arm part meat block of a slaughtered animal halved through its spine with cervical vertebrae, shoulder butt and spareribs removed, the first bone segment including lower forelimb bones and an upper forelimb bone, and the second bone segment being a shoulder blade. In this case, a block of bone laden meat is clamped at its ankle part (or wrist part) and hanged, incision is made to meat along the lower forelimb bones and upper forelimb bone in longitudinal direction thereof, then spiral incision is made to meat from meat around the lower forelimb bones through the joint part to the joint side end of the upper forelimb bone to scrape the meat, then meat around the upper forelimb bone is scraped off by a meat scraper. Then, a block of bone laden meat with the lower forelimb bones and upper forelimb bone removed and a shoulder blade remaining is placed on a conveyor and the shoulder blade is removed.

As has been described heretofore, according to the apparatus of the invention, also tendons adhered firmly to the bones can be cut positively by the spiral incision. Further, meat scraping by the meat scraper is carried out following the spiral incision by which the meat is scraped from the clamped part through the joint part to the end part of the upper forelimb bone, clogging of meat to the pinching part of the meat separator, and incision making to meat around the bones and meat scraping-off can be performed by one operation continuously.

As incision making to meat and meat scraping is automated and performed by one operation continuously, operation efficiency is drastically increased.

Further, according to the apparatus of the invention, it is suitable to provide adjacent to a hanging section where de-boning is performed in a hanging state of bone laden meat a de-boning section (conveyor section) where de-boning is carried out automatically with bone laden meat placed in a lying state. In the conveyor section, a second bone segment which is difficult to remove from meat in a hanging state is removed automatically. Thus, by combining processing in a hanging state of bone laden meat and processing in a lying state of bone laden meat, an arm meat block can be de-boned with high level of automation, with high operation efficiency, and with high accuracy resulting in increased yield of meat.

BEST MODE FOR CARRYING OUT THE INVENTION

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

FIGS. 1 to 25 are drawings concerning the embodiment in the case the invention is applied to de-boning of an arm part meat block of a slaughtered pig.

Figure 1:
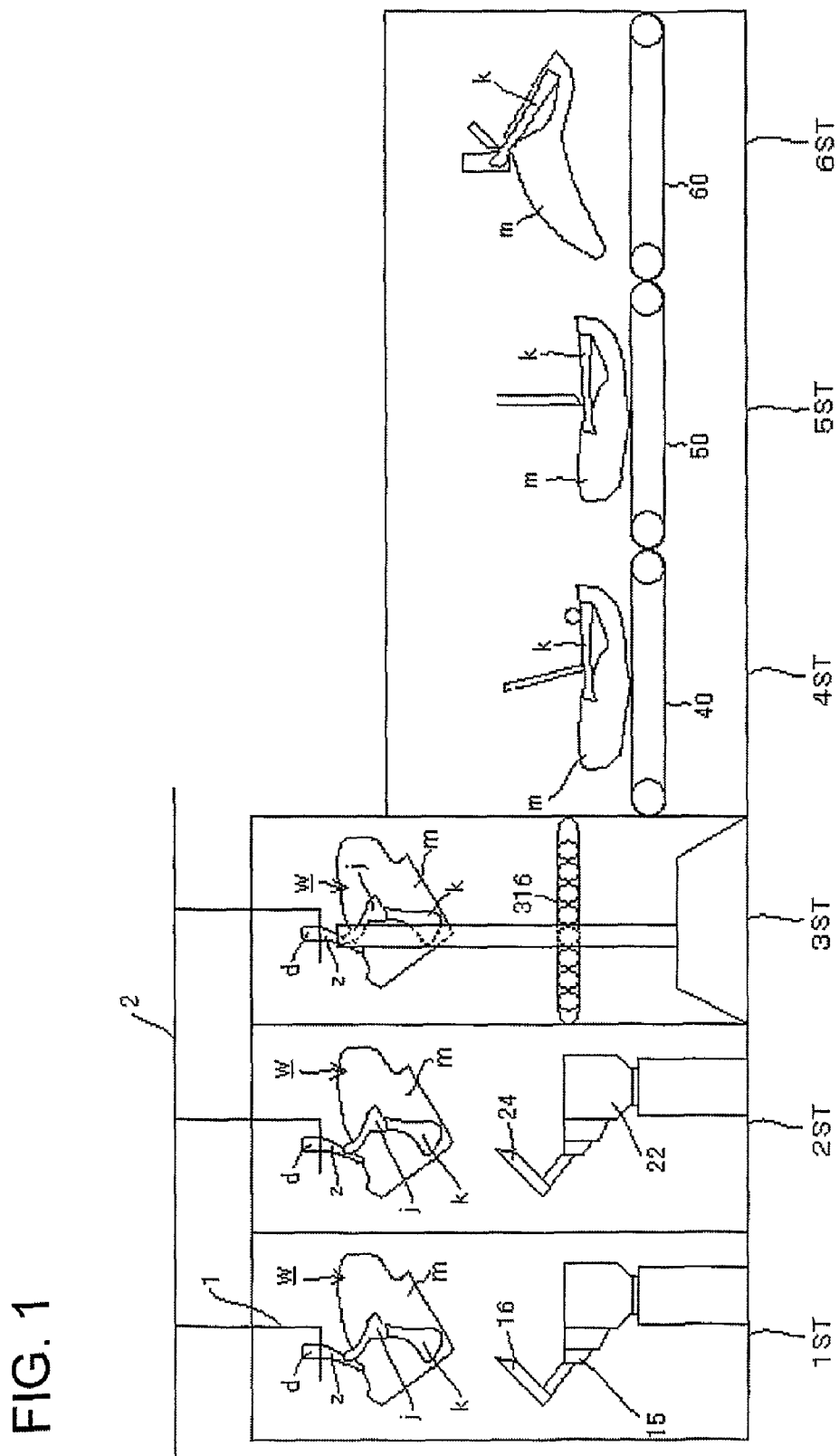
FIG. 1 is a schematic representation of overall configuration of an embodiment of the invention.
Figure 2:
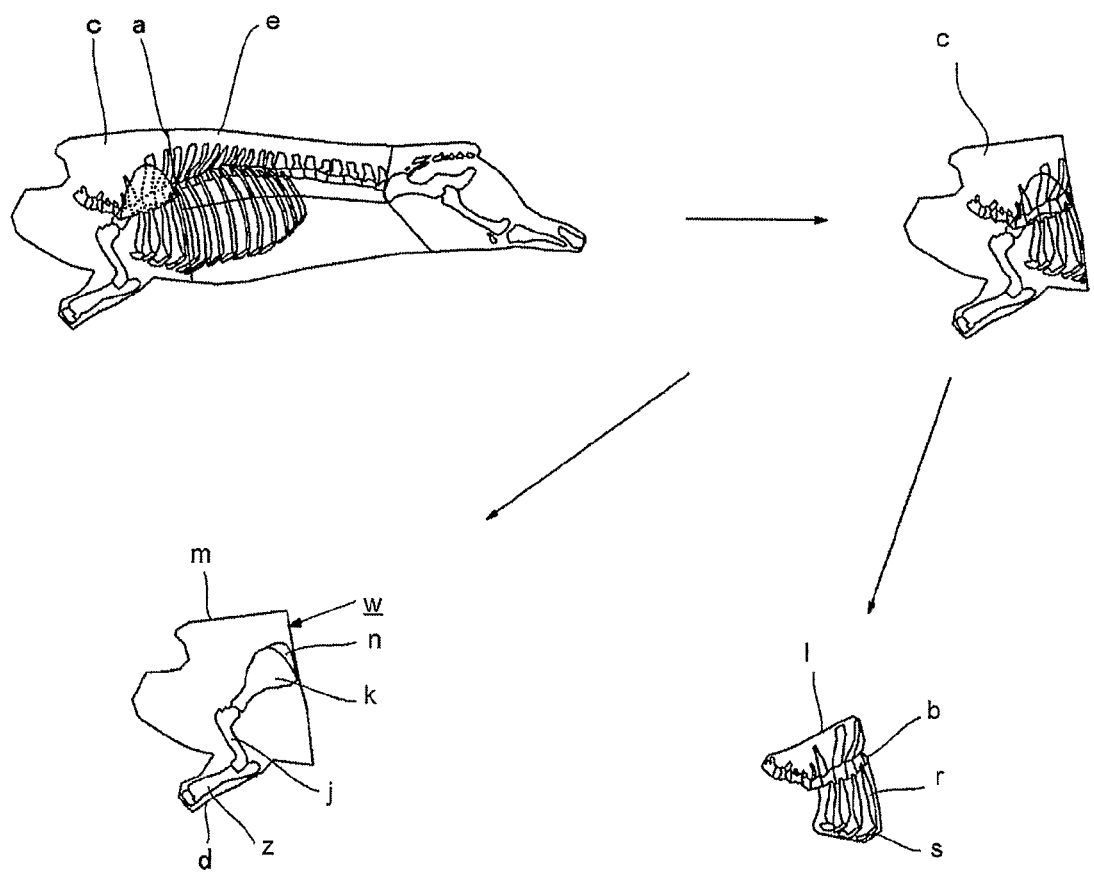
FIG. 2 is a drawing showing steps of processing a dressed carcass of pig to obtain a pig arm part meat block which is the object to de-bone.
Figure 3:
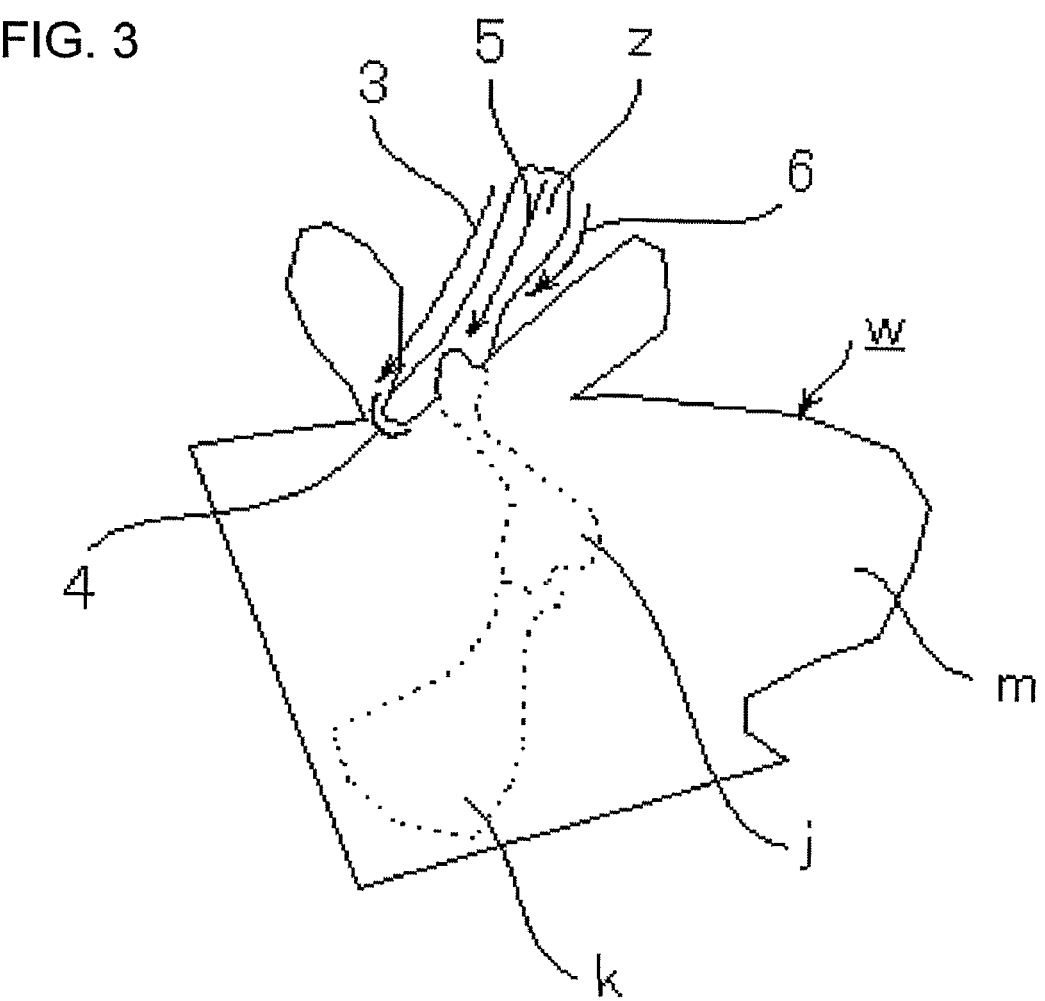
FIG. 3 is a drawing for explaining pre-processing of an arm part meat block of the carcass in the embodiment.
Figure 4A:
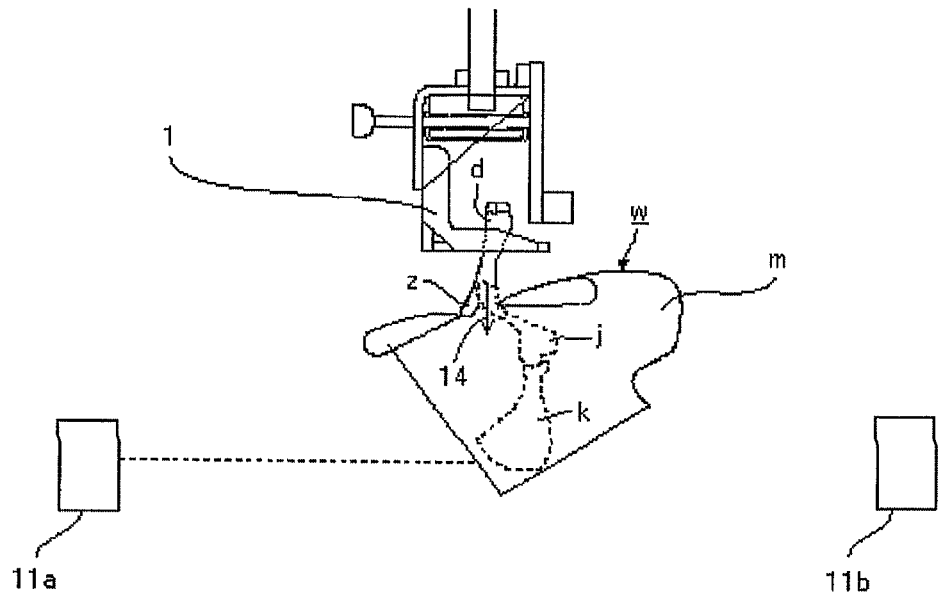
FIGS. 4A and 4B are drawing for explaining a means for measuring the total length of an arm part meat block of the carcass in the embodiment.
Figure 4B:
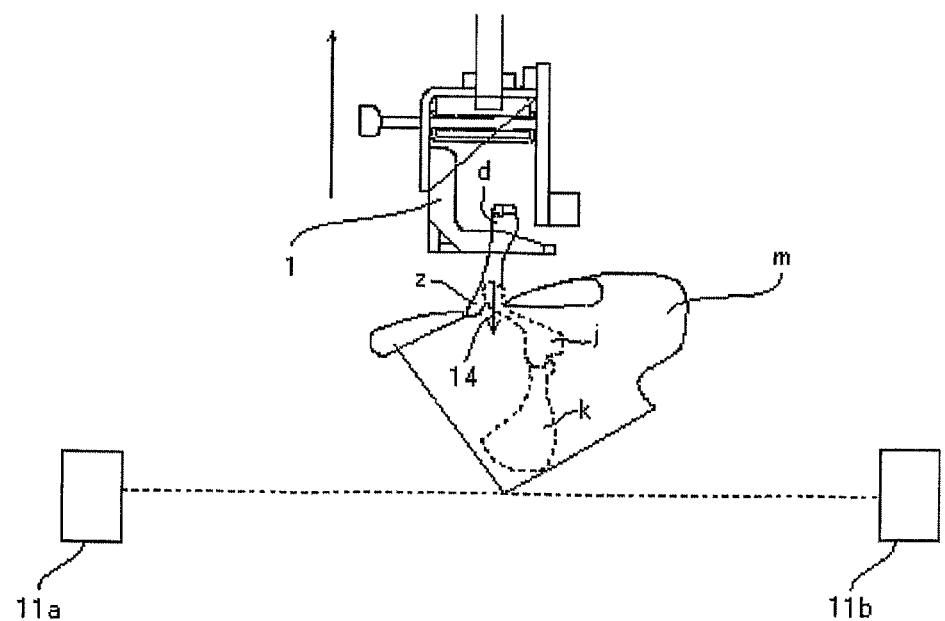

FIG. 1 is a schematic representation of overall configuration of an embodiment, FIG. 2 is a process drawing showing steps of processing a dressed carcass of pig to obtain a pig arm part meat block which is the object to de-bone, and FIG. 3 is a drawing for explaining pre-processing of an arm part meat block of the carcass.

In FIG. 1, an arm part meat block 'W' (hereafter referred to as a work) of a slaughtered pig is hanged with its end part 'd' of the lower forelimb bones (the end part is referred to as ankle part hereafter) held by a clamping device 1 after pre-processed as shown in FIG. 3, and the clamping device 1 is transferred along a transfer route 2 intermittently from a first station ST1 to a third station ST3 stopping at each station.

The lower forelimb bones 'z' and upper forelimb bone 'j' are removed from the work 'W' in the process between the first station ST1 and third station ST3, the pig arm meat block 'm' with a shoulder blade 'k' remained comes down onto a roller conveyor 316 and transferred to a belt conveyor 40 in a fourth station ST4, and de-boning of the shoulder blade 'k' is carried out while being transferred on the conveyor 40 in the fourth station St4, a conveyor 50 in the fifth station ST5, and a belt conveyor 60 in a sixth station ST6, these conveyors being seriated.

As shown in FIG. 2, the work 'W' is a part of a dressed carcass 'e' of a pig halved through its backbone and separated between the fourth rib and fifth rib along cutting line 'a' which is shown by 'c' and further got rid of cervical vertebrae 'b', shoulder butt 'I', and spareribs 's' including ribs 'r'. The work 'W' contains the lower forelimb 'z' including the ankle part 'd', upper forelimb bone 'j', and shoulder blade 'k'. The work 'W' is preprocessed before held by the clamping device 1 by making incision along the lower forelimb bones 'z' consisting of a radius and ulna as shown in FIG. 3 and forming a depression for clamping by the clamping device 1 in order to facilitate de-boning in succeeding processes. The incision consists of an incision line 3 along the side face of the ulna, an incision line 4 for slicing open around the elbow to allow the point of the elbow to be exposed, an incision line 5 along the surface of the ulna, and an incision line 6 along the surface of the radius.

The above is all of preprocessing operated manually. After the preprocessing, processing is carried out automatically by machines, and the incision making is easy, so workers can be released from hard labor. In the embodiment, the apparatus consists of six stations. From the first station ST1 to the third station ST3, processing is carried out with the work 'W' hanged from the clamping device 1. From the fourth station ST4 to sixth station ST6, processing is carried out with the work 'W' transferred on the belt conveyor. The clamping device 1 is transferred intermittently between the first and third station stopping at each station by means of a claw member fixed to a chain constituting the transfer route 2.

It is necessary in the de-boning process of the work 'W' that individual difference in size of the works is measured and incisions are made at appropriate positions in order to carry out accurate processing to works different in size. For this purpose, length of the work 'W' is measured in the first station before incision making process is started. A measuring method will be explained referring to FIGS. 4A and 4B. As shown in the drawings, a light emitting side photoelectric sensor 11$a$ and a light receiving side photoelectric sensor 11$b$ are located to face each other straddling the work 'W', the clamping device 1 hanging the work 'W' is moved up with a lifting unit 13 (see FIG. 5) by means of a servo motor, and lifted value of the lifting unit is detected at the instance that the light receiving side photoelectric sensor 11b has received the light emitted from the light emitting side photoelectric sensor 11a.

Figure 5:
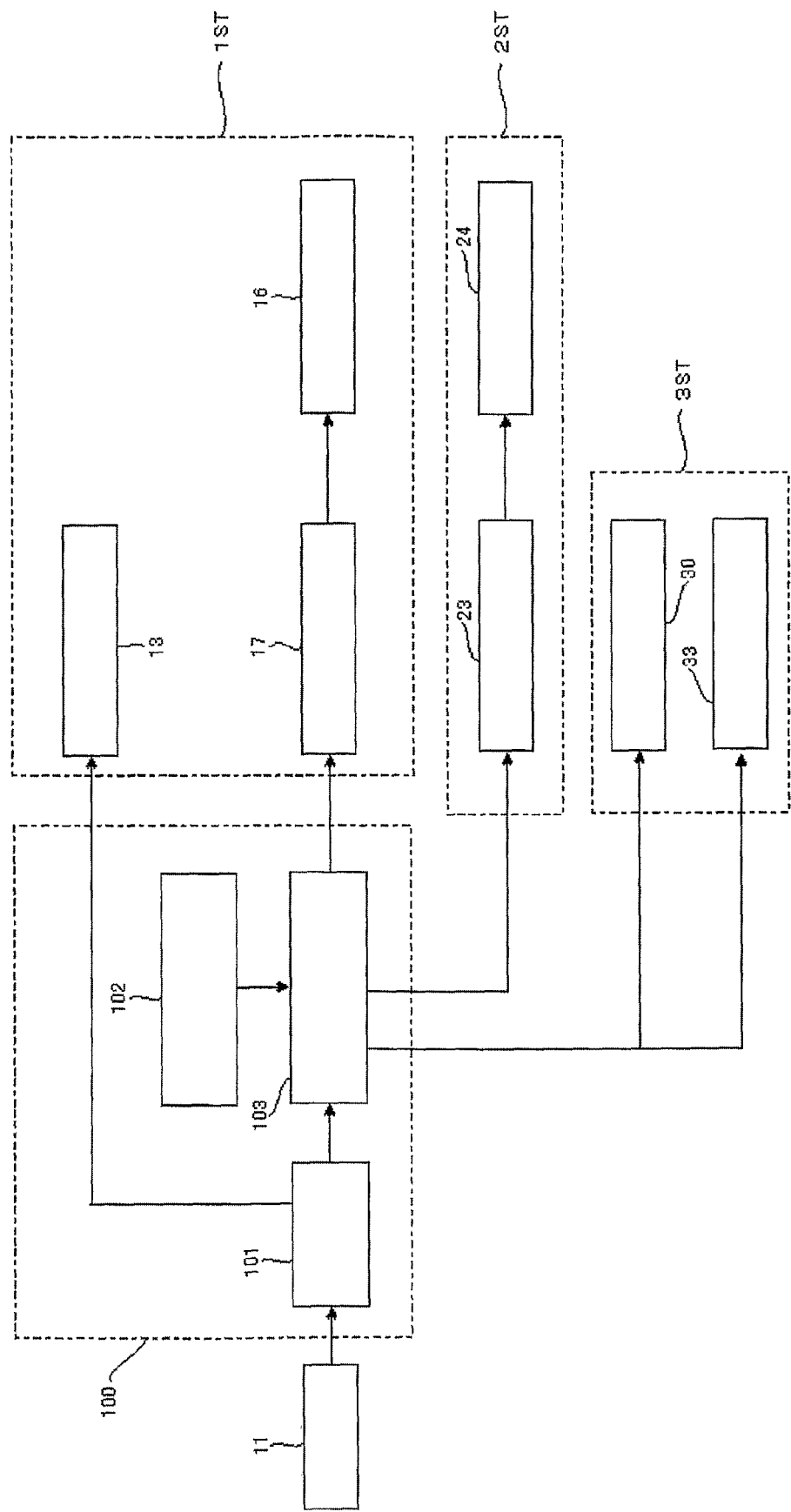
FIG. 5 is a control block diagram of the embodiment.

FIG. 5 is a control block diagram of the embodiment. The length from the clamping position of the work 'W' by the clamping device 1 to the lower end of the work 'W' (hereafter referred to as work length) is computed by work length detecting means 101 of a controller 100 based on the lifted value and original position of the clamping device 1 and height position of the sensors. By this operation, errors due to individual difference in size of works can be eliminated, and accurate incision can be made.

Following the above process, incision making at lower forelimb bones is carried out. After the measurement is finished, the clamping device 1 is again moved down to the original position by means of the lifting unit 13, the work 'W' is sandwiched from both sides thereof near the lower forelimb bones 'z' by a pair of meat separating members 310 and a fixing device similar to the pair of meat separating members 310 mentioned later to prevent swinging of the work 'W'. In this state, the clamping device 1 is moved up by a lift corresponding to the measured work length. Incision is made from both sides of the lower forelimb bones 'z' along the surfaces of the bones by means of a cutter having a vertical round blade, that means the blade rotates about a horizontal axis, not shown in the drawing while moving up the work 'W'. Therefore, the incision is made as shown by an arrow 14 in FIGS. 4A and 4B. Incision making to the meat part adhering to the surfaces of the lower forelimb bones is carried out by above operation.

The clamping device 1 is moved up by controlling the servo motor for lifting the lifting unit 13, based on the length of the work 'W' determined by the work length detecting means 101 as shown in FIG. 5.

As lifting value of the clamping device 1 is controlled based on the length of the work measured in the measuring step, occurrence of errors in incision making due to difference in work length of individual work ca be prevented.

Figure 6:
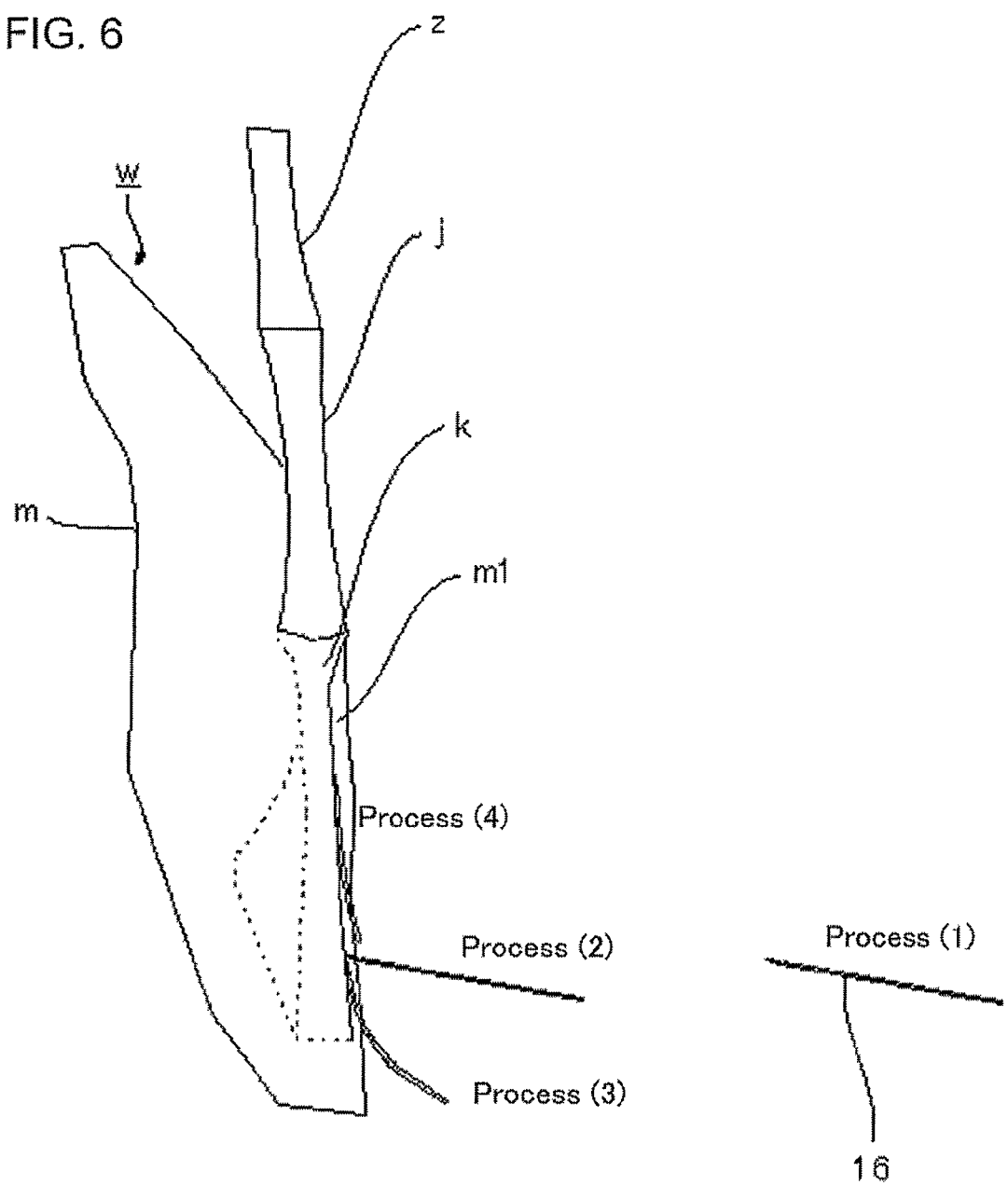
FIG. 6 is a drawing for explaining process of scraping off the thin meat part adhered to a shoulder blade in the embodiment.

Next, incision for scraping off the thin meat part adhering to the surface of the shoulder blade is made. In the state the work 'W' is prevented from swinging with the fixing device, incision making for scraping the thin meat part 'm1' is carried out using a thin plate-shaped cutter tool 16 attached to the end of an arm 15 of a 6-axis vertical multi-joint robot. As shown in FIG. 6, the cutter tool 16 is made of hardened stainless steel of thickness of 1 mm and capable of being elastic deformed. Even if the cutting edge of the cutter tool 16 is thrust against the meat part on the shoulder blade at an angle slightly oblique to the direction perpendicular to the surface of the shoulder blade 'k', the cutter blade bows or bends before it bites into the shoulder blade, so the cutting edge does not dig into the shoulder blade more than necessary.

As shown in FIG. 6, the cutter tool 16 is forwarded from process (1) to process (2), the cutting edge thrusts into the thin meat part 'm1' and strikes the surface of the shoulder blade 'k'. When the cutter tool 16 is further pushed, it bows or bends due to its flexibility as shown by process (3), as a result, the cutter tool 16 is introduced between the meat and shoulder blade 'k' without biting into the shoulder blade as shown by process (4), and the thin meat part 'm1'can be scraped off along the surface of the shoulder blade 'k'.

Further, the cutter tool 16 can make its way along the irregular surface of the shoulder blade closely contacting the surface.

Therefore, remnant meat on the surface of the shoulder blade is reduced, and stable and high yield scraping of the thin meat part can be possible.

In FIG. 5, a plurality of programs 102 for separating operation established in correspondence with work length is memorized in the controller 100. A program selecting means 103 selects a program to use corresponding to detected work length. A cutter tool drive device 17 which is attached to the robot arm 15 and operated under the selected program operates the cutter tool 16.

In this way, the cutter tool 16 is operated to follow an accurate trajectory, mismatching of the trajectory to individual work 'W' is prevented, remnant meat on the shoulder blade is reduced, and stable and high yield meat scraping is made possible.

Further, it is possible to reduce the reaction force against the cutter blade by adding variable servo gain function to the robot arm 15 so that servo stiffness (gain) at each axis of the robot arm 15 is reduced. By this, occurrence of over load to the work 'W' and the cutter tool can be evaded.

Figure 12:
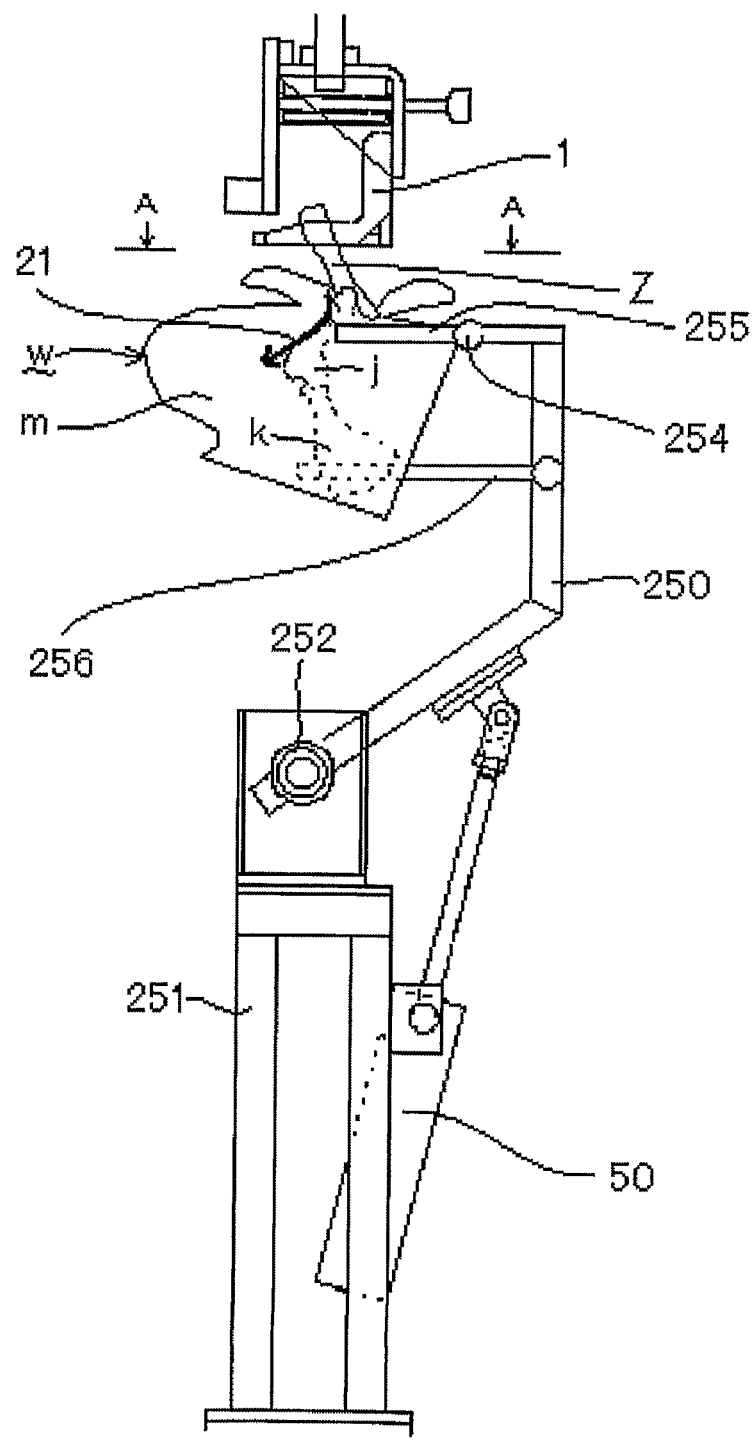
FIG. 12 is an elevation view of the meat holding mechanism in the second station (incision making step at an upper forelimb bone) in the embodiment.

Next, the work 'W' is transferred to the second station ST2, and incision making to the meat adhering on the upper forelimb bone 'j' is carried out. This incision is made as shown in FIG. 12 by an arrow line 21 such that the muscle under the cubital joint between the lower forelimb bones 'z' and upper forelimb bone 'j' is cut and incision is made from the brachial muscle groove to the deltoid tuberosity. This incision making is carried out as shown in FIG. 1 by attaching a cutter tool 24 to a 6-axis vertical multi-joint robot 22. As shown in FIG. 5, a separation operation program corresponding to the work length measured in the first station is selected by the program selecting means 103, and a drive device 23 for driving the cutter tool 24 is operated under the selected program.

As the cutter tool, a vibrating blade with a cutter guide disclosed in Japanese Laid-Open Patent Application No. 2994-321032 can be used. This cutter tool is advantageous in that, a cutter guide capable of moving relative to the cutter tool is provided, contact of the cutter guide to a bone is detected, the cutter tool is actuated upon receiving the detection signal, and the meat adhering on the surface of the bone is cut while allowing the cutting edge of the cutter tool to move along the surface of the bone, so even if the shape of the bone is complicated the meat can be cut along the shape of the surface of the bone.

Further, with the cutter tool, the meat is cut while applying tension force to the meat by the cutter guide, so cutting performance is increased and the cutting edge does not bite into the bone.

Figure 7:
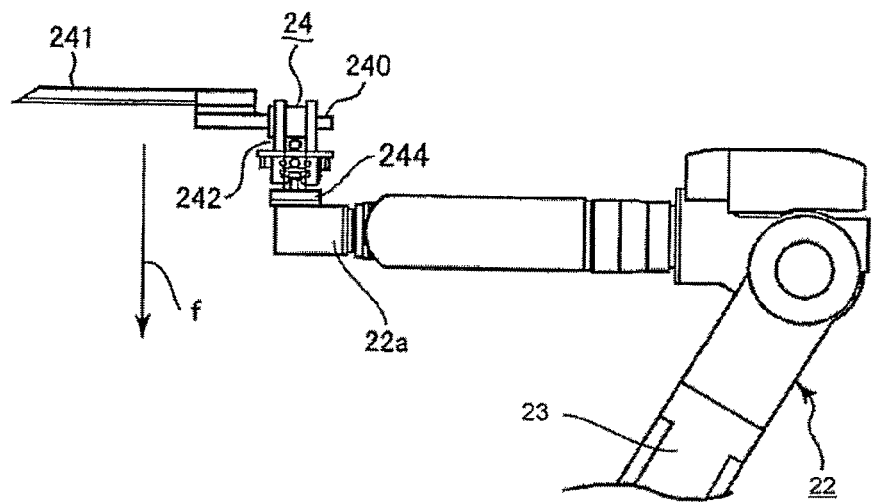
FIG. 7 is an elevation view of an incision making device in the embodiment.
Figure 8:
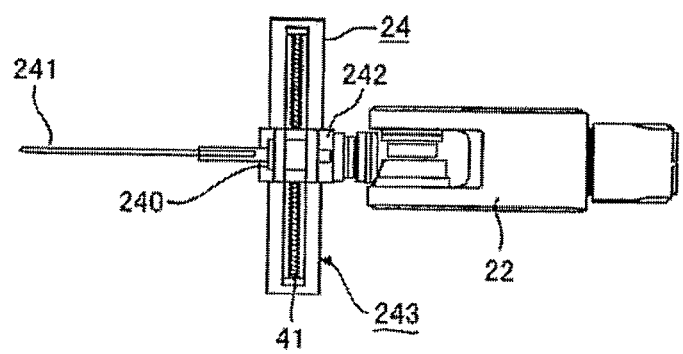
FIG. 8 is a plan view of the incision making device of FIG. 7.
Figure 9:
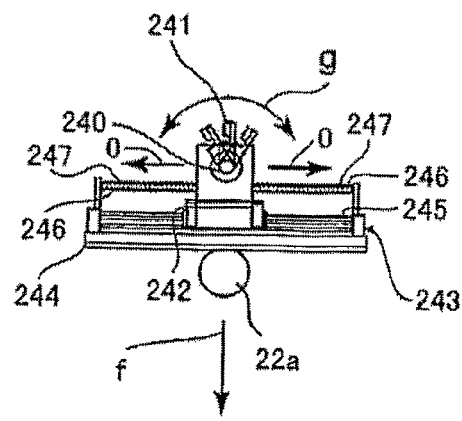
FIG. 9 is a side view showing a cutter tool of the incision making device of FIG. 7.

Further, an incision making device composed as shown in FIGS. 7 to 9 can be used. FIG. 7 is an elevation view and FIG. 8 is a plan view respectively of the incision making device, and FIG. 9 is a side view of the cutter tool of the incision making device. Referring to the drawings, the cutter tool 24 is attached to an end part 22a of the robot arm 22 of the 6-axis vertical multi-joint robot. In this case, also a program is selected in correspondence with the measured work length by the program selecting means 103 from among the plural programs 102, and the cutter tool 24 is driven by a cutter tool drive device 23 which is operated under the selected program.

The cutter tool 24 comprises a base member 242, a pivot shaft 240 supported rotatably by the base member 242, and a knife-shaped cutter 241 attached to the pivot shaft 240 at a position offset in direction opposite to traveling direction f of the cutter 241. The cutter 241 has a sharply V-shaped cutting edge.

By positioning the pivot shaft 240, which adjusts entering angle g of the cutter 241, nearer to the robot arm 22 than to the cutter 241, the point of action of force to move the cutter tool 24 comes to a position advanced toward the cutter traveling direction f from the cutter actually contacting the meat or bone of the work. As a result, to move of the cutter 241 along the surface of the bone becomes easy.

The base member 242 of the cutter 241 is possible to be slid by means of a slide mechanism 243 in the direction perpendicular to the cutter traveling direction f of the cutter 241. The slide mechanism 243 is composed of a laterally elongated base member 244 extending in the direction perpendicular to the cutter traveling direction f and fixed to the end part 22a, a linear guide rail 245 attached to the elongated base member 244, and a linear guide bar 246 attached to the elongated base member 244 above the linear guide rail 245. The base member 242 is fit slidably to the guide bar 246. Coil springs 247 are provided to surround the guide bar 246 in both sides of the base member 242 so that the base member 242 is positioned in the lateral center of the guide bar 246 by the spring force of the coil springs 247.

With this construction, the cutter 241 can be slid in both directions perpendicular to the cutter traveling direction f as shown by arrows 'o' in FIG. 9, and concurrently the entering angle g of the cutter 241 can be varied about the center axis of the pivot shaft 240. Therefore, the position and entering angle of a cutter 241 contacting the surface of the bone can be easily adjusted in correspondence with the size of bone and length of the work.

As mentioned above, a plurality of programs are prepared to make it possible to select a program which allows the incision making operation by the cutter tool 24 to match with work length, however, small errors may occur due to individual difference concerning size, position of joint in the work. Fine adjustment for compensating those errors can be performed by the cutter tool 24 having 2-degree-of-freedom, that is, by adjustment of the position of the cutter 241 by the slide mechanism 243 and adjustment of the entering angle g of the cutter 241 by the pivot shaft 240.

Figure 10:
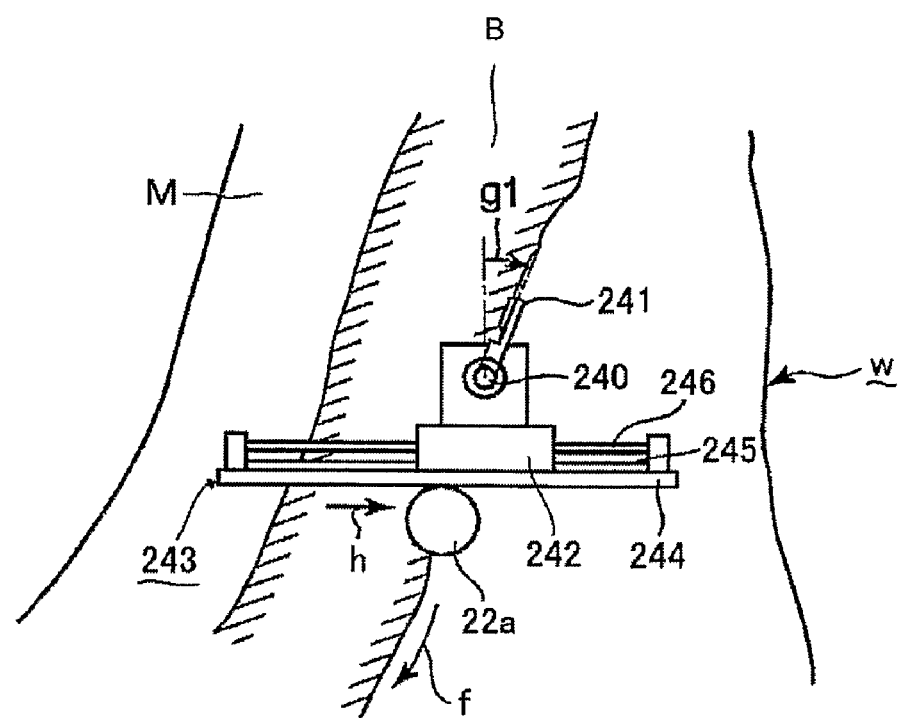
FIG. 10 is a drawing showing incision making process with the cutter tool.

Cutting operation by the cutter 24 will be explained referring to FIG. 10. Cutting operation of the cutter 24 is performed under a selected cutting operation program to correspond to work length. An initial position of the cutter 241 is set in the program, and the cutter 241 is moved until it contacts the bone B as shown in FIG. 10.

The error between the initial position set in the operation program and the actual position of the bone B due to difference of individual work is compensated by sliding of the base member 242 along the linear guide rail 245 in right or left direction (in direction h in FIG. 10) by reaction force exerting from the bone B on the cutter 241.

When the robot arm end part 22a moves from the initial position in the cutter traveling direction f under the operation program, the pivot shaft 240 is rotated by the reaction force exerting on the cutter 241 while the cutter 241 traveling along the surface of the bone B, by which the cutter entering angle is adjusted automatically to g1 so that the cutter 241 lies along the surface of the bone B.

In this way, difference between the position set in the program and the actual position when the cutter contact the bone due to different size of individual work can be compensated by means of the slide mechanism 243, and the cutter 241 travels along the surface of the bone B while being adjusted in its tilt angle by the rotation of the pivot shaft 241, which is located at a position nearer to the robot arm end part 22a than to the cutter 241, so that the cutting edge of the cutter 241 follows irregularities of the surface of the bone B.

Therefore, the cutter 241 can travel along the surface of the bone B avoiding possible biting of the cutting edge of the cutter 241 into the bone B or departing of the cutting edge from the surface of the bone B. Accordingly, cutting along the surface of the bone B in the longitudinal direction thereof can be carried out smoothly and the cutter can travel accurately on the boundary of surface of the bone B and meat, so the meat adhered on the bone B can be scraped off with high yield.

Figure 11:
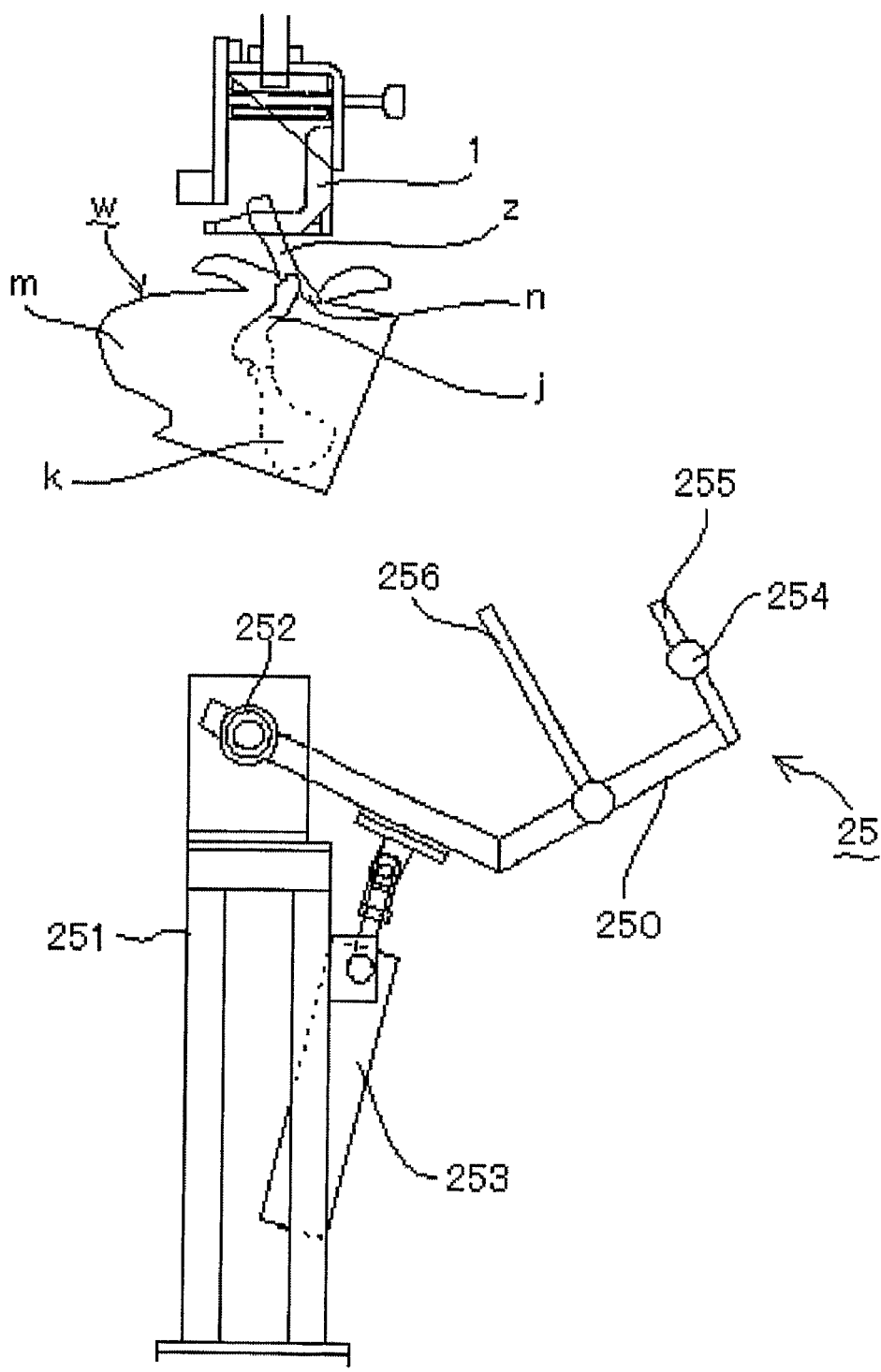
FIG. 11 is an elevation view of a meat holding mechanism in the second station (incision making step at an upper forelimb bone) in the embodiment.
Figure 13:
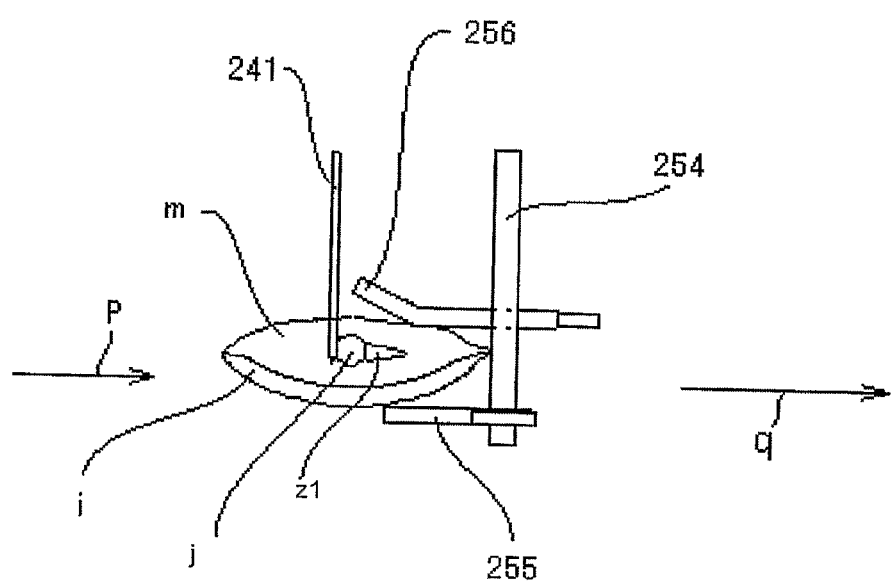
FIG. 13 is a plan view of the meat holding mechanism in the second station (incision making step at an upper forelimb bone) in the embodiment.

In the upper forelimb incision making step, a work holding mechanism 25 shown in FIG. 11 to FIG. 13 is used. FIG. 11 is an elevation view of the holding mechanism 25 when not engaged. FIG. 12 is an elevation view of the work holding mechanism 25 when the work is held, and FIG. 13 is a plan view of the work holding mechanism 25 when the work is held.

The work holding mechanism 25 comprises a base member 251, a support shaft 252 supported by the base member 251, a frame 250 supported rotatably about the support shaft 252, and an air cylinder 253 attached to the base member 251. The air cylinder 253 actuates to rotate the frame 250 to rotate about the support shaft 252.

A meat fat pusher bar 255 for pushing the surface of fat 'i' of the work 'W' is attached to the frame 250, and a meat pusher bar 254 is attached to the fat face pusher bar 255 perpendicularly thereto as can be seen in FIG. 13. The meat pusher bar 254 extends horizontally at the same height as the upper forelimb bone 'j' so that the pusher bar 254 support the force exerted on the work by the cutter 241 when incision is made.

A shoulder blade pusher bar 256 for pushing the surface of thin meat part 'm1' on the shoulder blade 'k' is attached to the frame 250 below the pusher bars 254, 255 to extend parallel to the fat pusher bar 255.

When making incision to the upper forelimb, the frame 250 is rotated by the air cylinder 253 to take a position to push the work 'W'. The meat pusher bar 254 pushes the work 'W' from the point of the elbow 'z1' side, the fat pusher bar 255 pushes the surface 'i' of the fat of the work 'W', and the shoulder blade pusher bar 256 pushes the surface to the thin meat 'm1' on the shoulder blade k'.

In this way, the work 'W' is held securely and incision can be made accurately. When the cutter tool disclosed in Japanese Laid-Open Patent Application No. 2004-321032 is used, it is preferable that the air cylinder 253 is provided with a relief mechanism for allowing the frame 250 to be moved backward in the direction of arrow q when force exceeding permitted force is exerted from the cutter tool on the work 'W' in the direction of arrow p, since the cutter is not provided with such a relief mechanism as the cutter tool 24.

Figure 14:
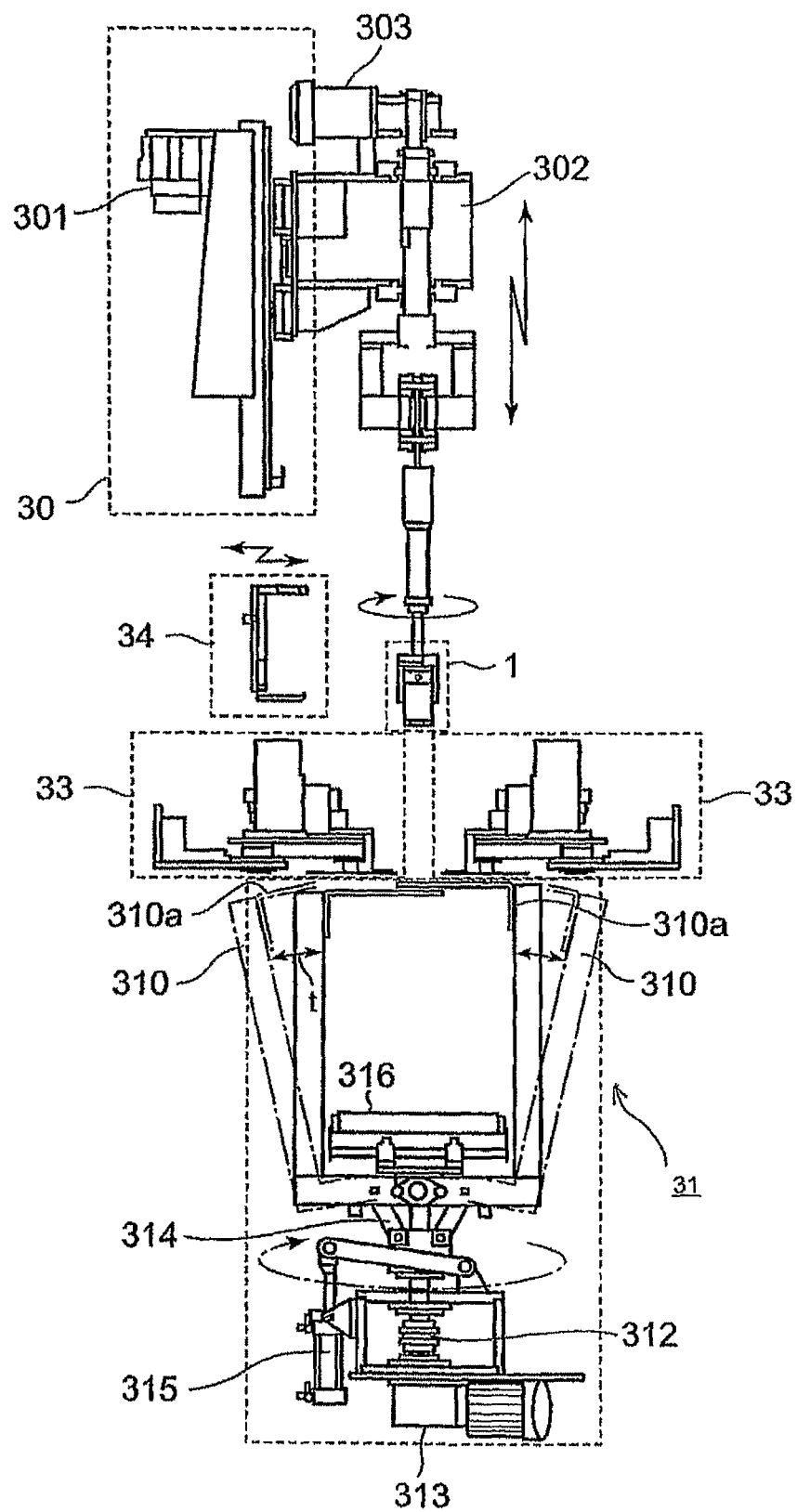
FIG. 14 is an elevation view of meat separating device unit in the third station (separating step of the lower forelimb bones from the upper forelimb bone) in the embodiment.

Next, the work 'W' is transferred with the clamping device 1 to the third station ST3. In the third station ST3, the work 'W' is rotated together with a pair of meat separators, cutting around the lower forelimb bones and upper forelimb bone with the round blade cutter and scraping of meat are carried out while the work 'W' is lifted by lifting the clamping device 1 by the lifting unit, and the arm meat block with the shoulder blade remained is discharged from the station. Devices used for the processing are shown in FIGS. 14 to 18. FIG. 14 is the overall configuration of the meat separating device unit. Referring to the drawing, a servo motor 301 provided to a lifting unit section 30, a lifting block 302 supporting the clamping device 1 is moved up and down by actuating the servo motor 301.

Figure 15:
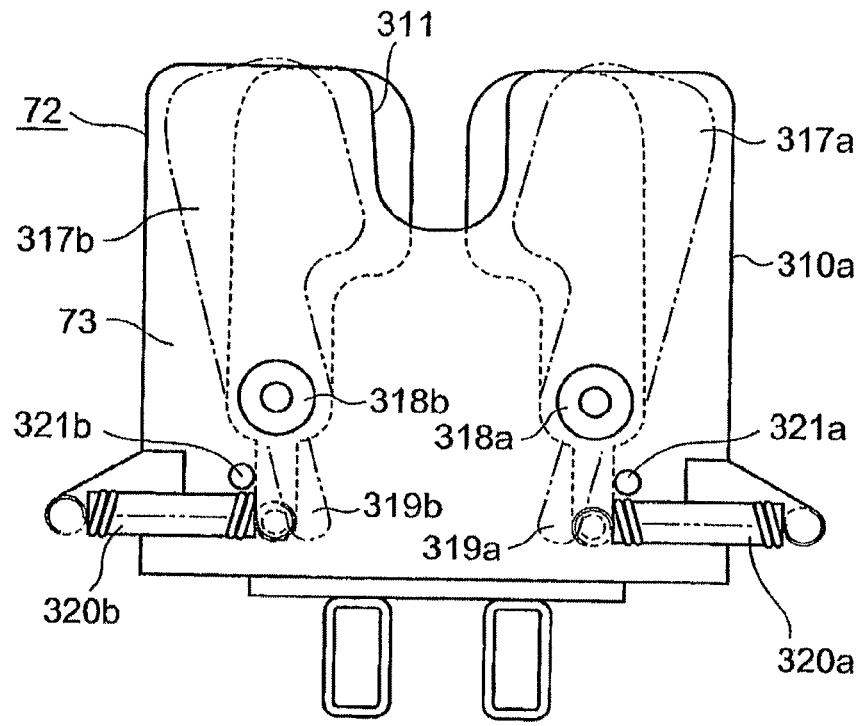
FIG. 15 is a plan view of a pincer plate for pinching the ankle part in the third station (separating step of the lower forelimb bones from the upper forelimb bone) in the embodiment.
Figure 16:
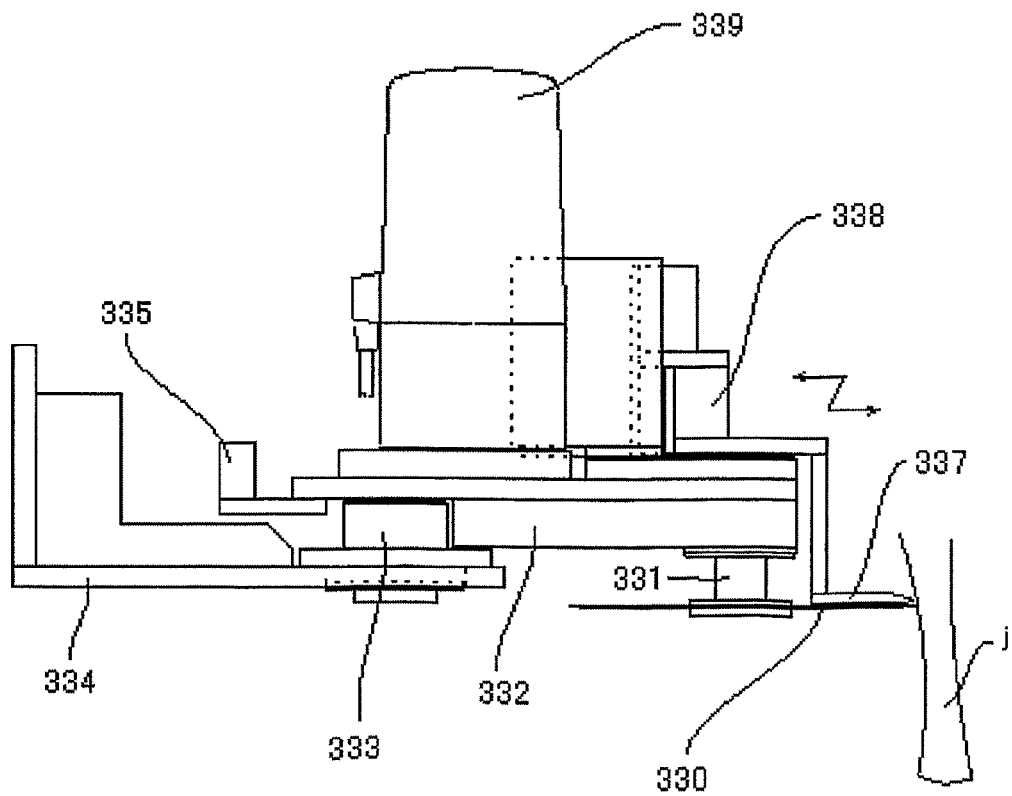
FIG. 16 is an elevation view of a cutter part in the in the third station (separating step of the lower forelimb bones from the upper forelimb bone) in the embodiment.
Figure 17:
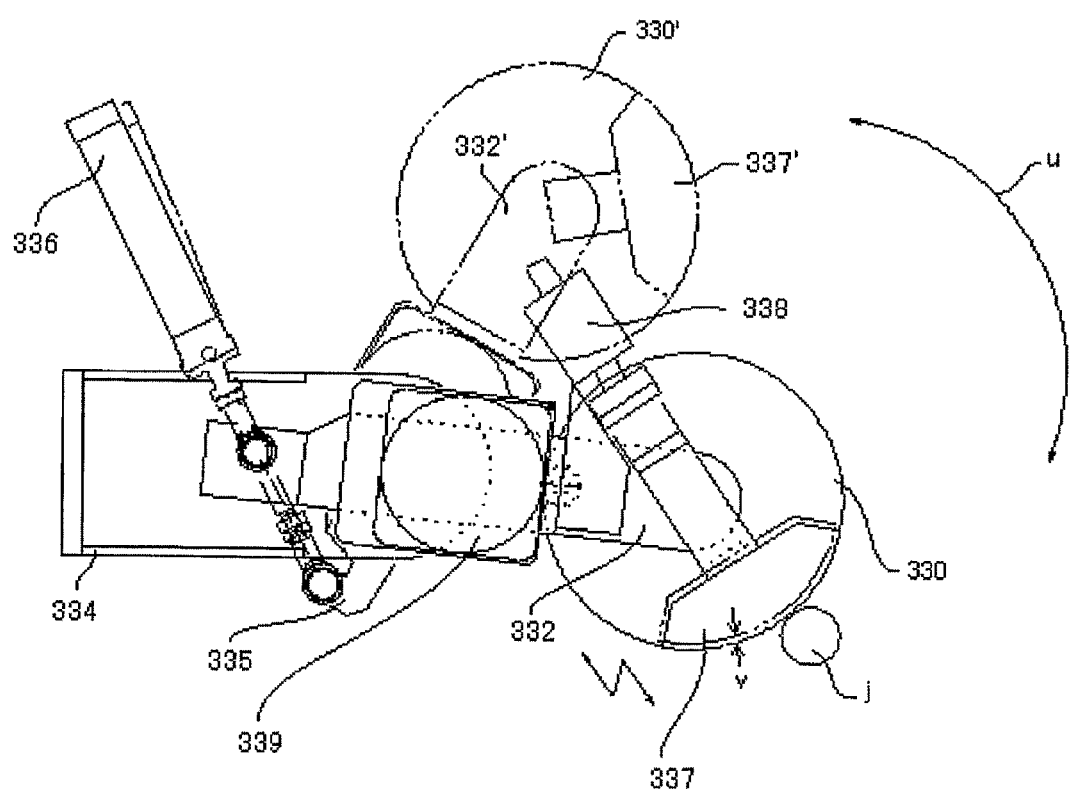
FIG. 17 is a plan view of the cutter part in the in the third station (separating step of the lower forelimb bones from the upper forelimb bone) in the embodiment.

An induction motor 303 is mounted on the lifting block 302, the clamping device 1 can be rotated by the induction motor while moving up and down. A meat separating section 31 is provided below the clamping device 1. As shown in FIG. 15, in the meat separating section 31 is provided with a pair of meat separating members 310, 310 each having a pincer plate 310a which has a recess, the ankle part of the work 'W' being able to be pinched by the both the recesses of the pincer plates when the pair of the meat separating members are shut so that the pincer plates brought to be horizontal.

The pair of meat separating members 310, 310 is connected to an induction motor 313 via a rotation shaft 312 to be driven by the induction motor 313. A synchronizing mechanism is provided to synchronize rotation of the induction motor 303 and 313 so that the clamping device 1 and the pair of meat separating members 310, 310 are driven in synchronism with each other.

The meat separating members 310, 310 are connected to a rod of an air cylinder 315 via a link mechanism 314 so that the members can be opened or shut in the direction of arrow t by actuating the air cylinder 315. A roller conveyor 316 is provided between the meat separating members 310, 310, arm meat block 'm' separated from the lower forelimb bones and upper forelimb bone falls onto the roller conveyor 316. When the meat separating members is opened, the roller conveyor 316 is slanted to the side of 4ST which is positioned directly next the roller conveyor 316 so that the arm meat block 'm' on the roller conveyor 316 is transferred to a conveyor belt 40 of the fourth station ST4.

As shown in FIG. 15, a pair of meat scraper plate 317a and 317b is attached on the undersurface of the flat pincer plate 310a such that each of the scraper plate is rotatable about a shaft 318a and 318b fixed to the pincer plate. A tension coil spring 320a, 320b each is engaged between claws formed at both right and left end parts of the meat scraper 317 and an end of both of the pincer plated 321a, 321b so that the end of each of the pincer plate is pulled by each of the tension spring to be rotated about each of the shaft 318a and 318b until the recess 311 of the pincer plate 310a is covered partly, 321a and 321b being stoppers of the rotation of the meat scraper plates 317a, 317b. When the ankle part of the work 'W' comes into the recess 311 of each of the pincer plates to be clamped by the pair of pincer plates, the scraper plates are forced open by the ankle part and the ankle part is pressed by the meat scraper plates 317a, 317b by the tension force of the springs 320a, 320b.

Between the lifting unit section 30 and meat separating section 31 is provided a pair of cutter section 33, 33 facing each other, between them the clamping device 1 can be descended. The cutter section 33 is detailed in FIGS. 16 and 17. Referring to the drawings, a round blade cutter 330 is disposed horizontally to face the work 'W' hanging from the clamping device 1. A cutter drive motor 339 is mounted on a supporting board 332. The supporting board 332 is supported on a fixing board 334 rotatably via a support shaft 333 fixed to the fixing board 334. The rod of an air cylinder 336 attached on the fixing board 334 is connected to a bracket 335 attached to the supporting board 332 at a peripheral part thereof and the supporting board 332 is rotated about the support shaft 333 in the direction of arrow u by actuating the air cylinder 336. Reference numeral 331 is a rotation shaft to which the c round blade cutter 330 is fixed and rotated by the cutter drive motor 339.

A cutter guard 337 is attached on the supporting board 332. The cutter guard 337 is attached on the supporting board 332 extending downward from the supporting board 332 and has a horizontal plate part at the down side extremity thereof, the outer periphery of the horizontal guard plate of the cutter guard 337 being shaped to coincide with the outer periphery of the round blade cutter 330.

An air cylinder 338 mounted on the supporting board 332 is connected to the cutter guide 337, and the round blade cutter 330 can be moved forward and backward by actuating the air cylinder 338 so that exertion of the cutter from the guard plate can be changed. It is permissible to compose such that in one of the pair of the cutter section 33 the cutter guard 337 does not move relative to the round blade cutter 330.

When carrying out de-boning, the clamping device 1 is lifted while it is rotated, and at the same time the air cylinder 336 is activated to advance the round blade cutter 330 toward the work 'W' to make incision to biological tissue such as tendon, muscle, and meat adhering around the lower forelimb bones 'z' through the joint part to the joint side end part of the upper forelimb bone 'j'. By making incision with the round blade cutter 330 while lifting the clamping device 1 with the device being rotated, meat around the bones of the work 'W' can be cut spirally. Therefore, the biological tissue adhered around the bones and joint can be cut with certainty and meat is scraped until the end part of the upper forelimb bone to allow the end part to be exposed.

Figure 18A:
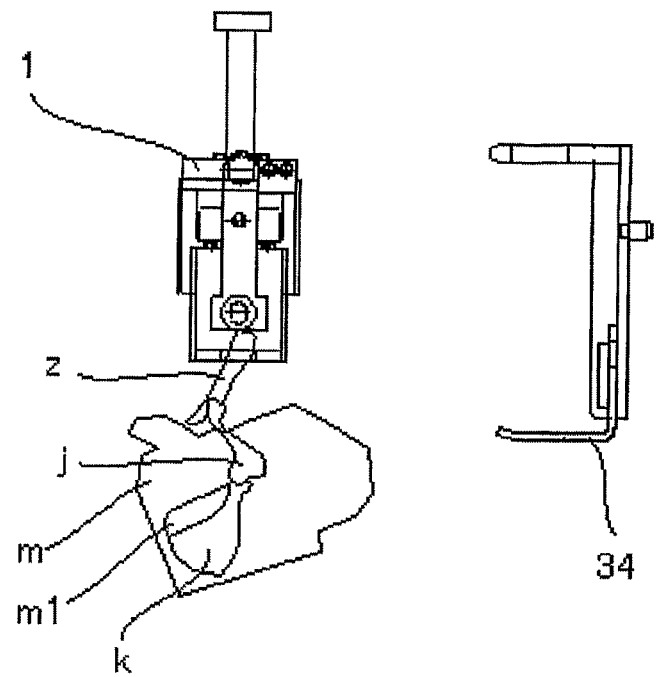
FIGS. 18A and 18B are drawings for explaining the state an auxiliary damper is used in the third station (separating step of the lower forelimb bones from the upper forelimb bone) in the embodiment.

Then, an auxiliary damper 34 clamps the exposed end part of the upper forelimb bone 'j' as shown in FIGS. 18A and B, and the exposed upper forelimb bone is pinched by meat scraper plate 317a, 317b. The auxiliary damper serves to prevent the joint between the lower forelimb bones and upper forelimb bone from dislocating when meat is scraped off by the meat scraper plates of the meat scraping members 310 by lifting up the work 'W'.

The work 'W' is further lifted up rotating in synchronism with the rotation of the pair of meat separating members 310.

As the meat scraper plates 317a, 317b are maintained to press the bones, meat around the upper forelimb 'j' can be scraped without fail.

As a result, although only one longitudinal incision is made to meat surrounding the upper forelimb bone in the second station ST2, de-boning of the upper forelimb bone can be performed with certainty.

Further, as cutting is performed while lifting the work 'W', there is possibility that shearing force, i.e. meat scraping force exerting on the round blade cutter 330 increases and cause breakage of the round blade cutter when depth of incision is excessively large. The cutter guard 337 is provided in order to prevent this. Since exertion v of the cutting edge of the round blade cutter 330 from the guard plate of the cutter guard can be adjusted, depth of incision can be restricted. When large force is required such as when making incision at the joint between the lower forelimb bones 'z' and upper forelimb bone 'j' and at the joint between the upper forelimb bone 'j' and shoulder blade 'k' and cutting of tendon at the joint, the cutter guard is shifted backward to increase the exertion v.

By providing the cutter guard 337 like this, occurrence of breakage of the round cutter 330 can be prevented and smooth incision making can be performed at the joint part where large force is required for making incision and cutting.

The pair of meat separating members 310, 310 is composed to be capable of being opened and shut or widened and narrowed. When the pair of meat separating members opens, the roller conveyor 316 located below is slanted, and the roller conveyor 316 is driven by the weight of the arm meat block 'm' separated from the lower forelimb bones 'z' and upper forelimb bone 'j' fallen down onto the roller conveyor 316 to transfer the arm meat block 'm' to the belt conveyor 40 in the adjacent fourth station ST4.

In the third station ST3 also the lift distance of the clamping device 1 and the shift distance of the cutter guard 337 at an arbitral position of the shifted clamping device 1 can be adjusted in accordance with the detected work length based on the measurement result of work length in the first station ST1. As shown in FIG. 5, the measured value of work length is sent from the work length detecting means 101 to the program selecting means 103, and a program is selected which has setting values of lift amount of the clamping device 1 and timing of advance and retreat of the round blade cutter 330 and cutter guard 337 corresponding to the detected work length from among a plurality of programs in each of which a value of lift amount of the clamping device and a value of timing of advance and retreat of the round blade cutter 330 and cutter guard 337 are set.

The servo motor 301 in the lifting unit section 30 and the air cylinder 338 in the cutter section 33 are driven under the selected program.

As a lift amount of the work 'W' and a position of the cutter guard relative to the round blade cutter 330 at an arbitral lifted position of the clamping device are determined in correspondence with the detected work length when making incision in the third step ST3, spiral incision line and depth of incision of the round blade cutter 330 can be determined to correspond to size of individual arm meat block. Therefore, accurate incision can be made with appropriate incision depth. Accordingly, meat remaining on the bones can be reduced resulting in high yield of meat scraping, and at the same time cutting can be performed smoothly preventing excessive force from exerting on the round blade cutter 330 due to shearing force, i.e. meat scraping force.

Figure 18B:
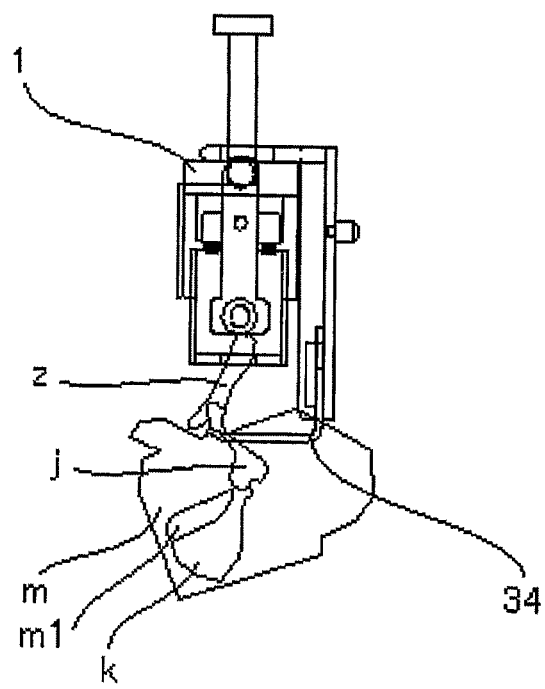

Cutting operation is divided in an anterior half for cutting meat from the lower forelimb bones 'z' to the joint part between the lower forelimb bones 'z' and upper forelimb bone 'j', and a posterior half for cutting meat from the upper forelimb bone 'j' to the joint part between the upper forelimb bone 'j' and shoulder blade. Before shifting from the anterior half to the posterior half, the joint part between the lower forelimb bones 'z' and upper forelimb bone 'j' is supported from its under side as shown in FIGS. 18A and 18B in order to prevent dislocation of the joint. The symbol 'm1' in FIG. 18 is the thin meat part peeled off from the surface of the shoulder blade 'k' in the first station ST1.

Lastly, the joint part between the upper forelimb bone 'j' and shoulder blade 'k' is cut with the round blade cutter 330. The arm meat block 'm' with the shoulder blade 'k' remaining in it is dropped onto the roller conveyor 316, the arm meat block 'm' is transferred to the belt conveyor 40 in the fourth station ST4.

In this way, incision making around the lower forelimb bones 'z' and upper forelimb bone 'j', and cutting of the joint part between the upper forelimb bone 'j' and shoulder blade 'k' can be performed at short times continuously in one operation process.

In the fourth station ST4 and succeeding stations, it is necessary to process the arm meat block 'm' with the shoulder blade remaining in it such that the thin meat part 'm1' peeled in the first station ST1 and remaining on the surface of the shoulder blade is erected, incision made to the side part of the shoulder blade 'k', and lastly the shoulder blade 'k' is scraped off from the arm meat block 'm'. In the embodiment, the processing mentioned above is divided in three steps and carried out in three stations of the fourth station ST4 to sixth station ST6. In these stations, removing operation of the shoulder blade is carried out on the conveyor located in each station. The de-boned arm meat block 'm' is transferred to next process.

Figure 19:
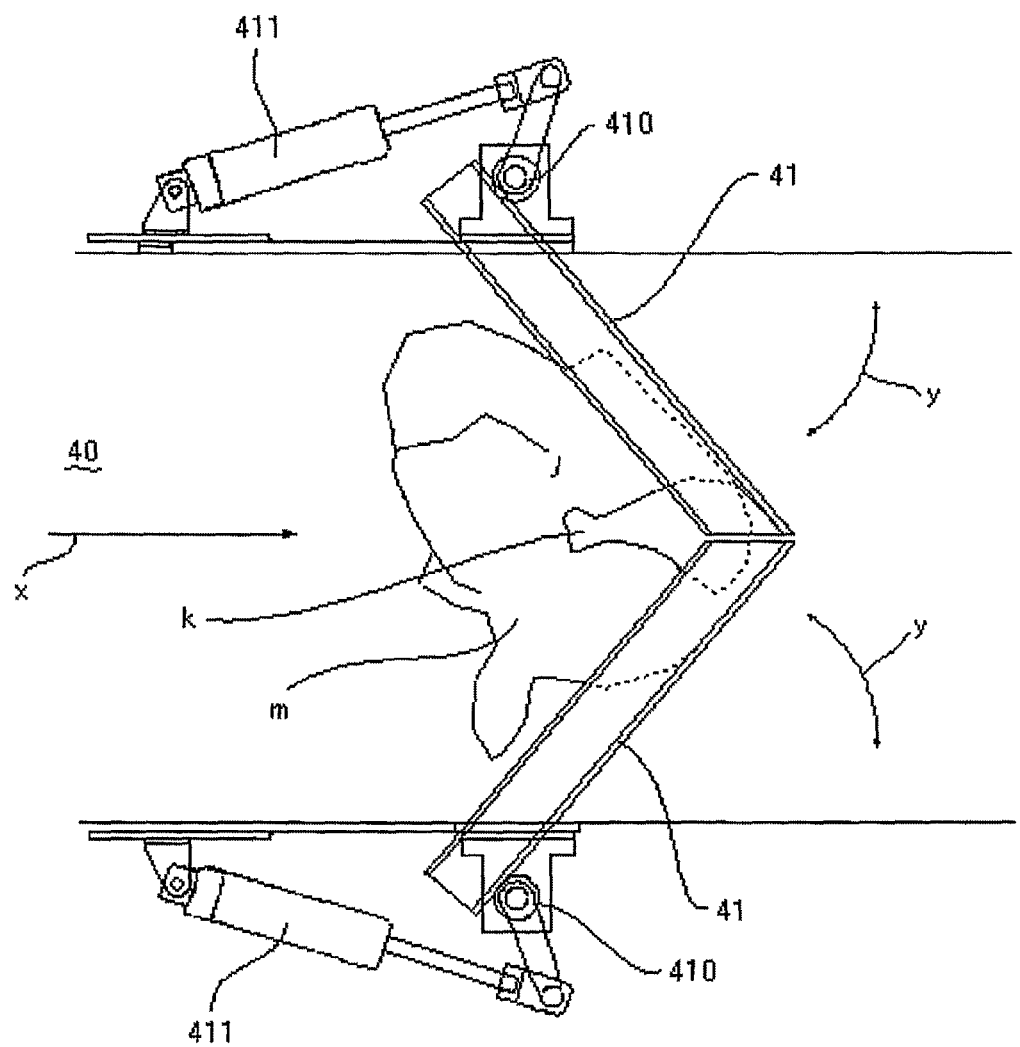
FIG. 19 is a plan view of a positioning device of meat 'm' in the fourth station in the embodiment.

The shoulder blade laden arm meat block 'm' obtained in the third station ST3 falls onto the belt conveyor 40 in the fourth station ST4 and transferred in the direction of arrow x, as shown in FIG. 19. The arm meat block 'm' fallen onto the belt conveyor 40 is different in position and attitude when fell on the belt conveyor, so it is necessary to perform positioning on the belt conveyor 40, for harmful influence may occur in the succeeding process if the arm meat block 'm' is transferred without modified in the position and attitude thereof. However, the arm meat block 'm' must be fallen always with the shoulder blade upside.

Positioning guides 41, 41 are provided to extend from both side of the belt conveyor 40, the guides 41, 41 form a general shape of a letter "V" on the belt conveyor to position the arm meat block 'm' by utilizing the fact that V-shape is formed by the surface 'i' of the shoulder butt side fat and the cutting surface between the fourth rib and fifth rib when the work 'W' is separated from the dressed carcass 'e' of a pig halved through its backbone and separated.

As shown in FIG. 19, an end of each of the positioning guides 41, 41 is supported by each of support shafts 410, 410 provided at both sides of the belt conveyor 40 such that each of the positioning guides is rotatable about each of the support shafts 410, 410 in the direction of arrow y by actuating each of air cylinders 411, 411 provided at both sides of the belt conveyor. By allowing the positioning guides 41, 41 to form V-shape on the belt conveyor 40, the arm meat block 'm' transferred on the belt conveyor 40 is pushed against the positioning guides 41, 41. By this, the arm meat block 'm' is positioned on the centerline of the belt conveyor 40, and succeeding processing can be eased.

Figure 20:
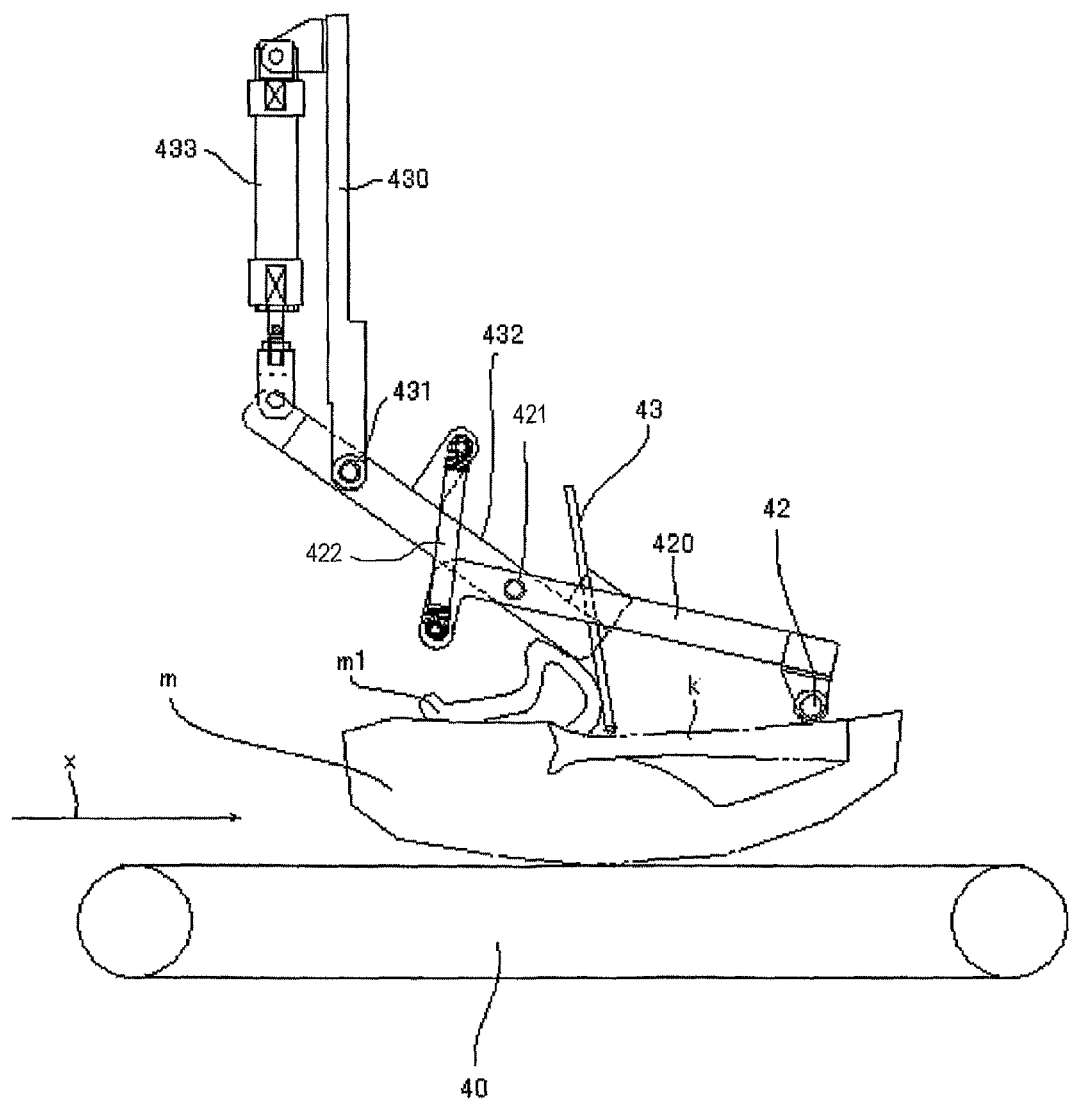
FIG. 20 is an elevation view showing thin meat turn-over step in the fourth station in the embodiment.

After this positioning, the thin meat part 'm1' on the shoulder blade 'k' of the arm meat block 'm' transferred on the belt conveyor 40 is turned over by a bar member 43 while pushing the upper surface of the shoulder blade 'k' by a holddown roll 42 in the fourth station ST4, as shown in FIG. 20. Mechanism to push by the holddown roll 42 is composed such that, a fixed frame 430 is provided above the conveyor, a movable frame 432 is supported by a shaft 431 fixed to the fixed frame 430 rotatably about the shaft 421, a movable frame 420 is supported by a shaft 421 fixed to the movable frame 432 rotatably about the shaft 421. A spring 422 is provided between the shaft 431 and 421 such that an end of the spring is engaged with the movable frame 432 and the other end is engaged with an end of the movable frame 420. The holddown roll 42 is provided to the other end part of the movable frame 420.

The movable frame 432 can be rotated by an air cylinder 433 attached between the fixed frame 430 and an end of the movable frame 432 and the bar member 43 for turning over the thin meat part is attached to the other end of the movable frame 432 between the shaft 421 and the holddown roll 42. With this construction, the holddown roll 42 and the bar member 43 can be moved up and down by actuating the air cylinder 433. The rotation axis of the holddown roll 42 is horizontal and perpendicular to the transfer direction x of the belt conveyor 40, and the bar member 43 is a little slanted backwardly in relation to the transfer direction x.

With this construction, the holddown roll 42 and the bar member 43 are lowered toward the surface of the shoulder blade 'k' by actuating the air cylinder 433, and the shoulder blade 'k' is slanted a little forwardly in relation to the transfer direction x pushed with the holddown roll 42. This eases turning over of the thin meat part. The spring 422 pull the shaft 421 side end so that the holddown roll 42 pushes the arm meat block 'm', and the holddown roll can follow the surface of the shoulder blade always contacting the surface by virtue of the resilience of the spring 422.

The bar member 43 contacts the thin meat part 'm1' in the upstream side of the transfer direction x of the belt conveyor 40 and turns over the thin meat part 'm1' to expose the upper surface of the shoulder blade 'k'.

In this way, the holddown roll 42 pushes the arm meat block 'm' with proper pressure without damaging the meat, for the holddown roll 42 is supported by way of the spring 422, and the thin meat part 'm1' remaining on the shoulder part can be easily turn over by the bar 43.

Next, the arm meat block 'm' is transferred from the belt conveyor 40 to a belt conveyor 50 in the fifth station ST5. In the fifth station ST5 is carried out incision making along both sides of the shoulder blade using a 4-axis horizontal multi-joint robot. First, after the turn-over operation of the thin meat part 'm1' is finished in the fourth station ST4, positioning of the arm meat block 'm' is again performed using positioning guides of the same type as those used in the fourth station ST4.

Figure 21:
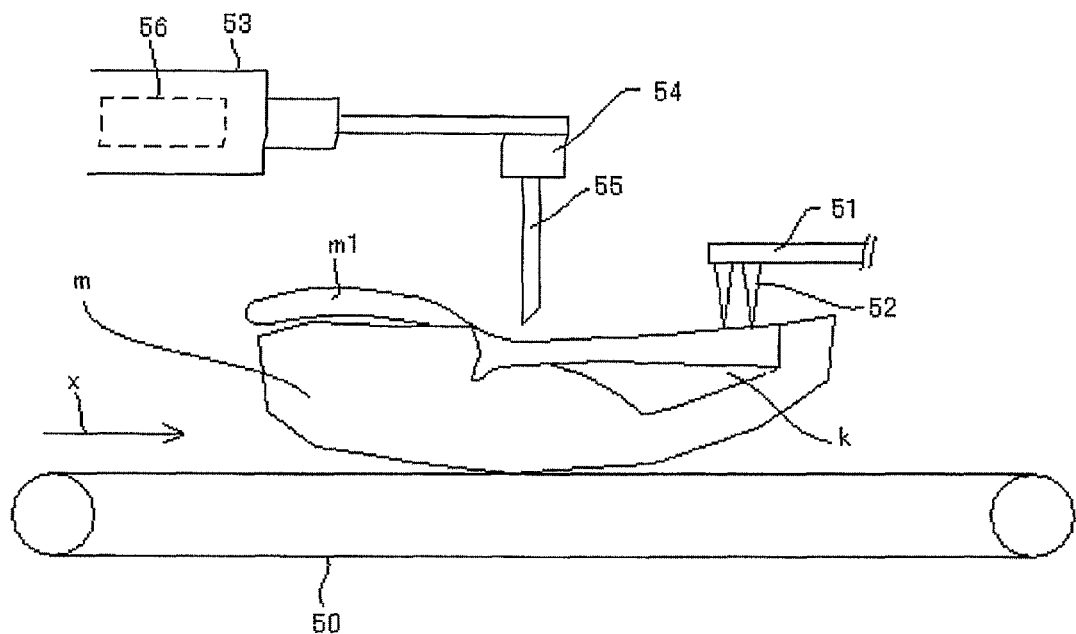
FIG. 21 is an elevation view of side incision making step of the shoulder blade and measuring step of height position of the shoulder blade in the fifth station in the embodiment.

In the fifth station ST5, as shown in FIG. 21, the conveyor 50 is stopped, a shoulder holder 51 having needle-shaped teeth 52 is moved down from above the shoulder blade 'k' of the arm meat block 'm' to positively fix the arm meat block 'm', then incision is made along both sides of the shoulder blade.

A cutter tool 54 attached to a 4-axis horizontal multi-joint robot arm 53 is composed similar to the cutter tool shown in FIGS. 7 to 10. A knife-shaped cutter 55 attached to the cutter tool 54 is mounted slidable in the direction perpendicular to the moving direction of the cutter tool 54 along the transfer direction x and swingable in the transfer direction x so that the cutter 55 does not dig into the bone. The cutter 55 can run along the sides of the bone owing to the slidability of the cutter tool 54. Therefore, the cutter 55 can be run flexibly accommodating to the size of the shoulder blade 'k' when making incision along the sides of the shoulder blade.

Figure 22:
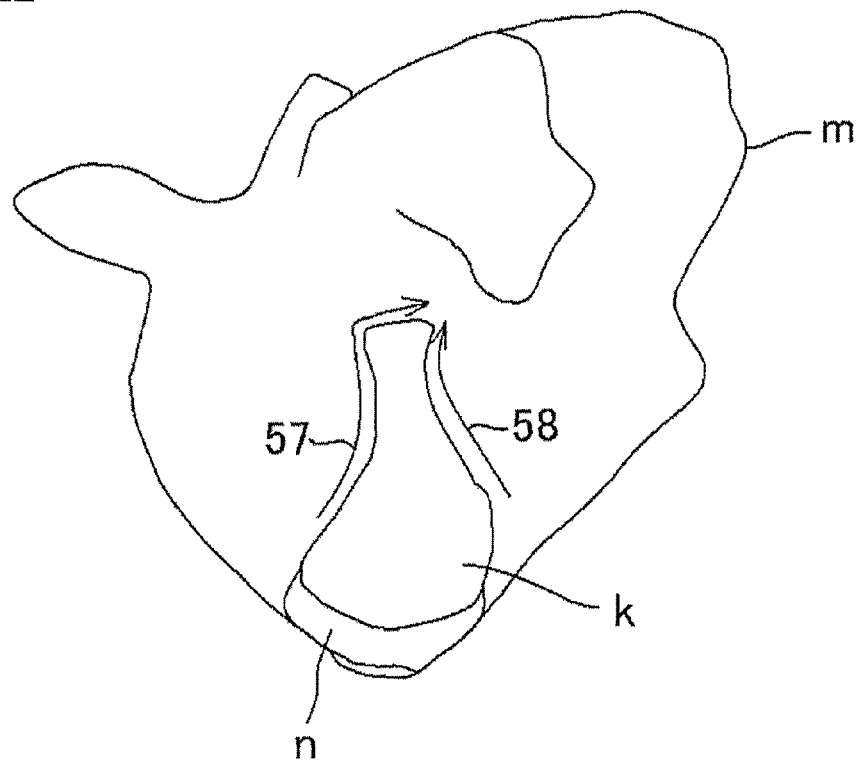
FIG. 22 is a drawing showing lines of incision along both sides of the shoulder blade in the fifth station in the embodiment.

First, the torque of a Z axis (lifting shaft) of the 4-axis horizontal multi-joint robot arm 53 is reduced to allow the cutting edge of the knife-shaped cutter 55 to contact the upper surface of the shoulder blade with weak force, and a coordinate value is read. An appropriate incision depth is computed by a computing unit 56, and a certain incision depth is maintained. Incision lines are shown in FIG. 22. First, incision is made along a line 57, then along a line 58. By the incision, the membrane between the shoulder blade 'k' and arm meat block 'm' is separated and the muscle connecting the shoulder blade to the arm meat block 'm' can be cut.

By using the cutter tool 54 of construction like this, accurate incision can be made while adjusting the incision lines to some difference of contour of individual shoulder blade.

After the incision making is finished, the shoulder blade holder 51 is raised, the arm meat block 'm' is positioned again by the positioning guides. Then the belt conveyor 50 is driven again to transfer the arm meat block 'm' to the sixth station ST6.

Figure 23:
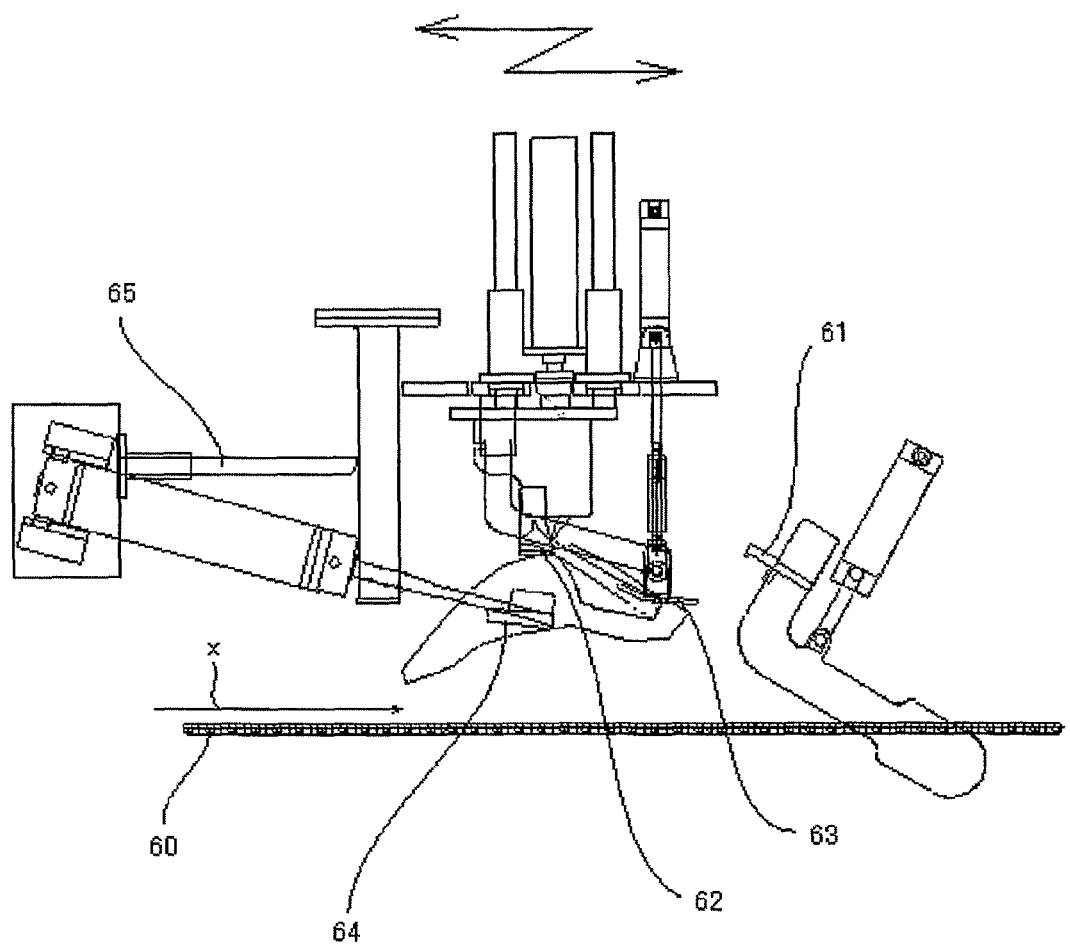
FIG. 23 is an elevation view showing the sixth station (shoulder blade separating step) in the embodiment.
Figure 24:
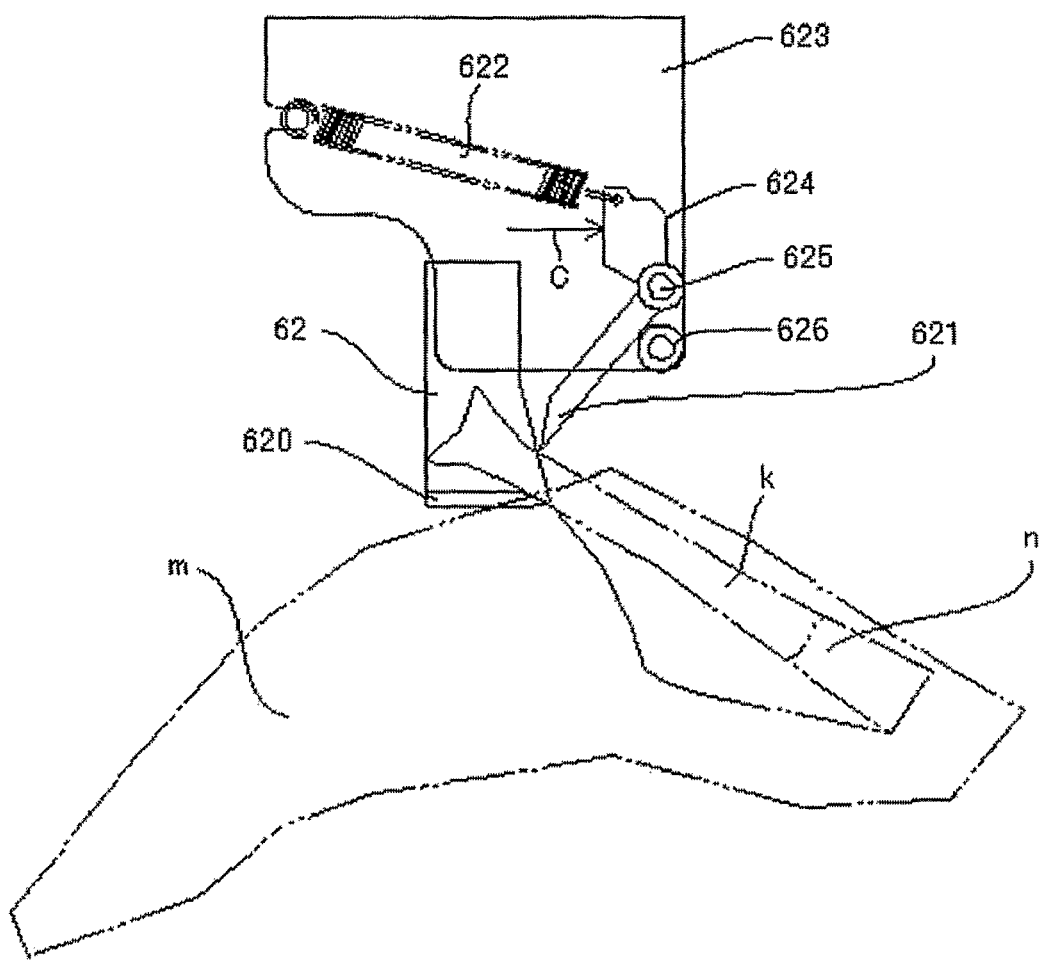
FIG. 24 is a partly enlarged view of FIG. 23.
Figure 25:
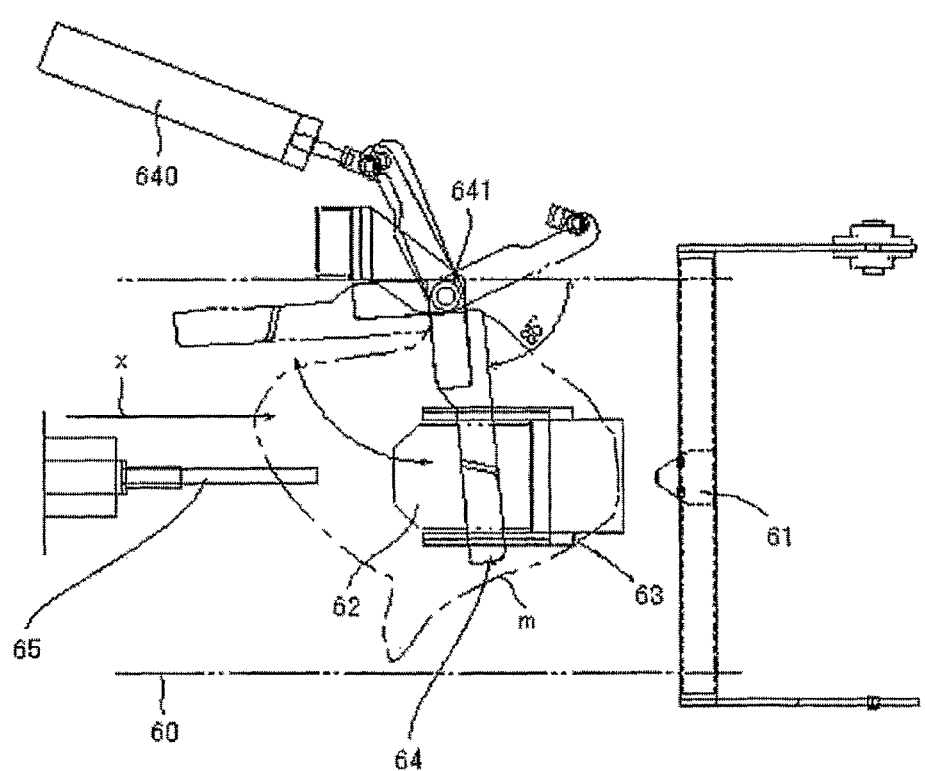
FIG. 25 is a plan view of the sixth station shown in FIG. 23.

In the sixth station ST6, the shoulder blade 'k' with scapular cartilage 'n' is scraped off from the arm meat block 'm'. In FIGS. 23 to 25, the front edge of the arm meat block 'm' transferred to a belt conveyor 60 in the sixth station ST6 is detected by a photoelectric sensor, and the belt conveyor 60 is stopped upon detection of the front edge. After the belt conveyor 60 is stopped, a shoulder blade holder 61 having needle-shaped teeth is descended from above the shoulder blade to push the shoulder blade 'k' and stabilize the meat 'm' so that the shoulder blade 'k' is inclined in a state the rear side of the shoulder blade is raised upward. A shoulder blade chuck 62 having a U-shaped cutter 620 at a lower end thereof is fixed to a support plate 623.

A chuck cutter 621 is attached to the support plate 623 rotatably about a support shaft 625 fixed to the support plate 623. An arm 624 is connected to the chuck cutter by the support shaft 625. An end of a tension spring 622 is connected to the arm 624 of and the other end of the spring is connected to the support plate 623, therefore the chuck cutter 621 is urged by the tension spring 622 in counterclockwise rotation direction. The counterclockwise rotation of the chuck cutter 621 is stopped by a stopper 629 fixed the support plate 623. After the shoulder blade 'k' is pushed by the shoulder blade holder 61 to incline the work 'W', the support plate 623 is descended and advance in the transfer direction x (in the right direction in FIG. 24), the shoulder blade 'k' passes through a gap between the U-shaped cutter 620 and the chuck cutter 621 pushing the chuck cutter 621 against elastic force of the spring 622, and the root part of the shoulder blade of a kind of tree-leaf like shape is clamped with the U-shaped cutter 620 and the chuck cutter 621.

Then, a cartilage holder 63 is moved down to hold down the scapular cartilage 'n' adhering to the head part of shoulder blade 'k' and a part of the shoulder blade near the scapular cartilage 'n'. By this, the head part of the shoulder blade and the meat adhering thereto is prevented from being reflexed upward when pulling the shoulder blade to remove it from the meat as mentioned later.

Then, the support plate 623 is raised together with the cartilage holder 63 supporting from above the forward end part of the work 'W'. Therefore, the work 'W' is lifted up from the belt conveyor 60 clamped by the U-shaped cutter 620 and chuck cutter 621 and supported by the cartilage holder 63 from above.

In this state, a meat separator bar 64 is rotated from the upstream side toward downstream side of the transfer direction x about a support shaft 641 by actuating an air cylinder 640 until the separator bar 64 is positioned at about 85° in relation to the transfer direction x as shown in FIG. 25 while pushing the arm meat block 'm' toward the downstream side.

Then, the support plate 623 is moved backward (in the left direction in FIG. 24) to pull the shoulder blade 'k' with the meat part 'm' held by the separator bar 64. The meat part 'm' separated thus from the shoulder blade 'k' falls down onto the belt conveyor 60. When the meat adhering to the under surface of the shoulder blade falls down, the cartilage holder 63 is raised, and the shoulder blade 'k' with scapular cartilage 'n' remains in the state chucked by the chuck cutter 621 and U-shaped cutter 620. Then the support plate 623 is moved up, and a shoulder blade discharging bar 65 provided at a height level the same as the moved up support plate 623 is protruded in the transfer direction x to push the upper arm 624 of the chuck cutter 621 to rotate the chuck cutter 621 in the direction C as shown in FIG. 24. By this, the chuck cutter 621 is rotated in clockwise about the support shaft, the chucking of the shoulder blade with the U-shaped cutter 620 and the chuck cutter 621 is released, and the shoulder blade with scapular cartilage falls on the belt conveyor 60.

As described above, in the sixth station ST6, removing of the shoulder blade from the arm meat block can be automated by the apparatus of the invention without manual operation, in which the shoulder blade is held down with the shoulder holder 61 so that the rear side of the shoulder blade face the U-shaped cutter 620, the root part of the shoulder blade of a kind of tree-leaf like shape is clamped with the U-shaped cutter 620 and the chuck cutter 621, and the shoulder blade is removed from the meat part by pulling it in a state the scapular cartilage part is supported from above with the cartilage holder 63 and the meat adhering to the under surface of the shoulder blade is held by a meat separator bar 64, so meat remaining on the shoulder blade 'k' can be reduced and high yield de-boning is possible. Further, as the shoulder blade and scapular cartilage are held down by the cartilage holder 63 when removing the shoulder blade form the arm meat block, the cartilage 'n' can be prevented from being reflexed upward or jumping up in the operation, and a phenomenon is prevented that the scapular cartilage separates from the shoulder blade and remains in the arm meat block.

As has been described, according to the embodiment, removing of the lower forelimb bones 'z' and upper forelimb bone 'j' in the first to third stations are carried out with the work 'W' hanged from the clamping device 1, so problems due to weighty work to be processed is eliminated and handling of the work is eased, as a result, sanitary de-boning is possible preventing adhesion of microbes to the work.

Automation was made possible by transferring intermittently the work 'W' hanging from the clamping device 1 and making incision with the clamping device fixed at each station. Particularly, automation was realized by using a cutter tool attached to a multi-axis multi-joint robot arm which operates under an established program for making incision of complicated trajectory such as incision in longitudinal direction along the upper forelimb bone 'j' and incision at the thin meat part 'm1' adhering on the surface of the shoulder blade 'k'.

As incision making at the lower forelimb bones 'z' and around the upper forelimb bone 'j' are carried out by rotating the clamping device 1 and the pair of meat separating members 310, 310 in synchronism with each other while the clamping device 1 is lifted up, incision is made spirally. Therefore, biological tissue such as tendons, etc. firmly adhering on the joint between the lower forelimb bones 'z' and upper forelimb bone 'j' can be cut. As the meat part is scraped by the pair of meat separating members while making incision spirally around the lower forelimb bones 'z' and meat is scraped off from the upper forelimb bone 'j' by the meat scraper, meat does not clog on the pincer plates 310a of the meat separating members, and scraping off of the meat around the cutting lower forelimb bones 'z' and upper forelimb bone 'j' can be completed by one operation.

As incision making is carried out after measurement of work length to determine a lift amount of the work in correspondence with the measured work length and an exertion of the round blade cutter 330 from the cutter guard for an arbitral lift amount of the work, occurrence of error in incision making due to difference in size of individual work can be eliminated, as a result yield of meat is increased and smooth incision is possible without loading the round blade cutter 330 excessively with shearing force due to scraping the meat when incision is while the work is moved up.

By carrying out shoulder blade removing operation in the fourth to sixth stations by placing the work on the conveyor with conveyor being stopped in each station, accurate incision along the complicated surface profile of the shoulder blade can be made by automatic de-boning operation.

Thus, almost all of de-boning operation of a pig arm part meat block 'W' was automated including incision making at the lower forelimb bones, upper forelimb bone, and shoulder blade except for a little work of preprocessing, resulting in that accurate incision is made at the upper forelimb bone and shoulder blade, that remnant meat on the bones is reduced resulting in remarkably increased yield of meat.

INDUSTRIAL APPLICABILITY

According to the invention, high level of automation is attained in removing bones from arm part or thigh part meat block of a carcass, and scraping of meat can be performed by one continuous operation, so operation efficiency is drastically increased. Further, accurate incision can be made resulting in increased yield of meat.

The invention claimed is:

1. A method of de-boning a bone laden meat hanging with an end part of unconcealed part of the bone clamped with a clamping device by lifting up the bone laden meat in a state in which the bone laden meat is pinched under the end part by a meat separator having a set of meat scraper plates which are biased to elastically pinch the bone of the bone laden meat below an ankle part following change of size of the bone as the bone laden meat is lifted up in order to scrape off the meat part of the bone laden meat, the method comprising:

lifting up and rotating the bone laden meat so that a part of the meat including tendons are cut and scraped by spiral incision with a cutter located between a clamping part of the meat clamped with the clamping device and the meat separator caused by the rotation of the bone laden meat, and scraping off the remaining meat by the meat separator while allowing the meat separator to rotate in synchronism with the bone laden meat as the bone laden meat is further lifted up.

2. An apparatus for de-boning a bone laden meat, the apparatus comprising:

a clamping device for clamping an exposed end part of the bone to hang the bone laden meat, a meat separator having a set of meat scraper plates which are biased to elastically pinch the bone of the bone laden meat below the end part so as to be maintained to press the bone as the bone laden meat is lifted up, thereby scraping off meat part of the bone laden meat, a cutter located between the clamping device and meat separator, a lifting means for lifting the clamping device, and a rotating means for rotating the clamping device and the meat separator in synchronism with each other, whereby a part of the meat is scraped off as the clamping device is lifted up while an incision is made spirally to the part of the meat including tendons owing to the rotation of the bone laden meat, then a remaining part of the meat is scraped off by the meat separator rotating in synchronism with the meat separator as the bone laden meat is lifted up.

3. An apparatus for de-boning a bone laden meat as claimed in claim 2, wherein a cutter guard is provided to cover the upper surface of the cutter, the cutter guard being able to be shifted so that exertion of the cutting edge of the cutter from the cutter guard is adjustable.

4. An apparatus for de-boning a bone laden meat as claimed in claim 2 or 3, wherein the bone laden meat is an arm part meat block of a dressed carcass and the clamping device clamps an exposed end part of lower forelimb bones to hang the arm part meat block, and wherein an auxiliary clamper is provided to the clamping device for holding an exposed end part of an upper forelimb bone of the arm part meat block after the meat around the lower forelimb bones is scraped off by the spiral incision, thereby preventing a joint between the lower forelimb bones and upper forelimb bone from being dislocated.

5. An apparatus for de-boning a bone laden meat as claimed in claim 4, further comprising: a measuring means for measuring length of the arm part meat block in a state of being clamped by and hanging from the clamping device from the clamped position to the lower end of the arm part meat block, a plurality of programs for computing a lift amount to be lifted by the lifting means and a shifting amount of the cutter guard in correspondence with measured length of the arm part meat block, and a selecting means for selecting a program which corresponds with the measured length of the arm part meat block, whereby de-boning operation is carried out depending on individually different size of the arm part meat block by controlling a lifting amount of the clamping device and a shifting amount of the cutter guard in accordance with the measured length of the arm part meat block.

6. An automatic de-boning apparatus for de-boning a bone laden meat having a first bone segment and a second bone segment, the automatic de-boning apparatus comprising:
   a hanging section for de-boning the first bone segment of the bone laden meat in a state of being hanged from a clamping device, and
   a conveyer section for de-boning the second bone segment of the bone laden meat in a state of being placed on a conveyor,
   wherein meat around the first bone segment is scraped off by using a de-boning apparatus after incision is made in longitudinal direction along the first bone segment in a state in which the bone laden meat is hanged in the hanging section, meat from which the first bone segment is removed is placed on a conveyor section with thin meat on the second bone segment upside, the thin meat which is separated from a surface of the second bone segment by making incision between the thin meat and the surface of the second bone segment, is turned over to expose an upper surface of the second bone segment, incision is made along a side contour of the second bone segment, then the second bone segment is scraped off from meat adhering on a rear surface of the second bone segment in the conveyor section, and
   wherein the de-boning apparatus includes a clamping device for clamping an exposed end part of the bone to hang the bone laden meat, a meat separator having a set of meat scraper plates which are biased to elastically pinch the bone of the bone laden meat below the end part so as to be maintained to press the bone as the bone laden meat is lifted up, thereby scraping off meat part of the bone laden meat, a cutter located between the clamping device and meat separator, a lifting means for lifting the clamping device, and a rotating means for rotating the clamping device and the meat separator in synchronism with each other, whereby a part of the meat is scraped off as the clamping device is lifted up while an incision is made spirally to the part of the meat including tendons owing to the rotation of the bone laden meat, then a remaining part of the meat is scraped off by the meat separator rotating in synchronism with the meat separator as the bone laden meat is lifted up.

7. An automatic de-boning apparatus for de-boning a bone laden meat as claimed in claim 6, wherein the hanging section includes a transfer means for transferring the bone laden meat intermittently to succeeding stations and a means for making at least incision and a means for scraping off the meat around the first bone segment after the incision is made to the meat.

8. An automatic de-boning apparatus for de-boning a bone laden meat as claimed in claim 6 or 7, wherein conveyors are provided in the conveyor section, and wherein an exposing means for exposing the upper surface of the second bone segment, a second incision making means for making incision along the side contour of the second bone segment, and a second separating means for scraping off the second bone segment are provided for each of the conveyors.

9. An automatic de-boning apparatus for de-boning a bone laden meat as claimed in claim 8, wherein the second incision making means has a cutter for making incision, a computing unit for determining depth of incision to be made based on distance of descent of a sensor descended from above the upper surface of the second bone segment until the sensor end terminal contacts the upper surface of the second bone segment, and a cutter drive device for moving the cutter in correspondence with result of the computation by the computer unit, whereby the incision is made in accordance with individually different size of the second bone segment.

10. An automatic de-boning apparatus for de-boning a bone laden meat as claimed in claim 9, wherein a vertical position detector of the cutter is provided to the cutter drive device, thereby the cutter functioning also as a sensor end terminal.

11. An automatic de-boning apparatus for de-boning a bone laden meat as claimed in claim 8, wherein the exposing means for exposing the upper surface of the second bone segment includes a thin flexible cutter provided in the hanging section for making incision between the thin meat adhering on a surface of the second bone segment and the surface by advancing the flexible cutter along the surface of the second bone segment, and a bar member provided in the conveyor section to turn over the thin meat separated from the surface of the second bone segment in the hanging section and lying on the surface by allowing the bar member to contact the rear surface of the thin meat thereby pushing the rear surface as the bone laden meat is transferred on a conveyor in the conveyor section.

12. An automatic de-boning apparatus for de-boning a bone laden meat as claimed in claim 11, wherein the incision making section are provided with a length measuring means for measuring distance from the clamped part of the bone laden meat clamped by the clamping device and hanged to the lower end of the bone laden meat, a plurality of programs in each of which is established beforehand a trajectory of movement of the flexible cutter in correspondence with length of the bone laden meat, a selecting means for selecting a program from among the plural programs in correspondence with the measured length, and a means for driving the cutter under the selected program, whereby the incision is made between the thin meat and the surface of the second bone segment in correspondence with individually different size of the second bone segment.

13. An automatic de-boning apparatus for de-boning a bone laden meat as claimed in claim 8, wherein the second bone segment has a cartilage part, and a plate member is provided in the conveyor section to hold down the upper part of the cartilage part when meat is scraped off from the lower surface of the second bone segment, thereby preventing the cartilage from being damaged when scraping off the meat.

14. An automatic de-boning apparatus for de-boning a bone laden meat as claimed in claim 6, wherein the bone laden meat is an arm part meat block of a slaughtered animal halved through its spine with cervical vertebrae, shoulder butt and spareribs removed, the first bone segment including lower forelimb bones and an upper forelimb bone, and the second bone segment being a shoulder blade.

* * * * *